United States Patent
Abotabl et al.

(10) Patent No.: US 12,040,892 B2
(45) Date of Patent: Jul. 16, 2024

(54) FEEDBACK FOR TRANSPORT BLOCKS WITH MULTIPLE MODULATION AND CODING SCHEMES

(71) Applicant: QUALCOMM Incorporated, San Diego, CA (US)

(72) Inventors: Ahmed Attia Abotabl, San Diego, CA (US); Ahmed Elshafie, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 63 days.

(21) Appl. No.: 17/547,007

(22) Filed: Dec. 9, 2021

(65) Prior Publication Data

US 2023/0188250 A1     Jun. 15, 2023

(51) Int. Cl.
*H04L 1/00*     (2006.01)
*H04L 1/1812*   (2023.01)
*H04L 5/00*     (2006.01)

(52) U.S. Cl.
CPC .......... *H04L 1/0014* (2013.01); *H04L 1/0003* (2013.01); *H04L 5/0053* (2013.01); *H04L 1/1812* (2013.01)

(58) Field of Classification Search
CPC ... H04L 1/0014; H04L 1/0003; H04L 5/0053; H04L 1/1812; H04L 1/1854; H04L 1/1864; H04L 1/0009; H04L 1/1614
See application file for complete search history.

(56) References Cited

U.S. PATENT DOCUMENTS

| | | | |
|---|---|---|---|
| 11,212,036 B2* | 12/2021 | Peng | H04L 1/1825 |
| 2019/0215128 A1* | 7/2019 | Zhang | H04L 1/16 |
| 2021/0021383 A1* | 1/2021 | Chen | H04W 72/23 |
| 2021/0136781 A1* | 5/2021 | Hosseini | H04L 1/1861 |
| 2021/0258998 A1* | 8/2021 | Khoshnevisan | H04L 5/0053 |
| 2023/0208565 A1* | 6/2023 | Yang | H04L 1/1861 370/252 |

FOREIGN PATENT DOCUMENTS

WO   WO-2018084791 A1 *  5/2018  .......... H04B 7/0613
WO   WO-2021223047 A1 * 11/2021

* cited by examiner

*Primary Examiner* — Mohamed A Kamara
(74) *Attorney, Agent, or Firm* — Guang Yu Zhang; Holland & Hart LLP

(57) ABSTRACT

Methods, systems, and devices for wireless communications are described. A user equipment (UE) may receive a feedback configuration for reporting feedback for transport blocks encoded with at least two encoding schemes and may receive a transport block comprising a plurality of code block groups (CBGs). A first subset of CBGs of the plurality of CBGs may be encoded using a first encoding scheme and a second subset of code block groups of the plurality of CBGs may be encoded using a second encoding scheme different from the first encoding scheme. The UE may transmit, according to the feedback configuration, a first feedback report for the first subset of CBGs corresponding to the first encoding scheme and a second feedback report for the second subset of CBGs corresponding to the second encoding scheme based on determining whether each of the plurality of CBGs of the transport block are decoded.

30 Claims, 18 Drawing Sheets

FEEDBACK FOR TRANSPORT BLOCKS WITH MULTIPLE MODULATION AND CODING SCHEMES

FIELD OF TECHNOLOGY

The following relates to wireless communications, including feedback for transport blocks (TBs) with multiple modulation and coding schemes (MCS).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communication systems, a user device (UE) may receive a downlink message from a base station including a transport block (TB) comprising a set of code blocks. The code blocks may be grouped into code block groups (CBGs) each including a subset of the set of code blocks. The UE may provide feedback to the base station based on whether the UE successfully decoded each code block or CBG of the TB transmitted by the base station. In some examples, all CBGs (e.g., each code block of the CBGs) may be successfully decoded, and the UE may provide a feedback report or a feedback message (e.g., a hybrid automatic repeat request (HARD) acknowledgement (ACK) message) indicating the successful receipt of the TB to the base station. In some other examples, the UE may be unsuccessful in decoding one or more code blocks or CBGs of the TB, and the UE may transmit a feedback message indicating that one or more CBGs of the TB were not successfully decoded or were associated with a decoding error.

SUMMARY

The described techniques relate to improved methods, systems, devices, and apparatuses that support hybrid automatic repeat request (HARQ) feedback for transport blocks (TBs) with multiple modulation and coding schemes (MCS). Generally, the described techniques provide for the communication of TBs including code block groups (CBGs) encoded with multiple encoding schemes (e.g., two or more MCS values)). For example, a user equipment (UE) may be configured to receive a TB including a first set of CBGs that are encoded using a first encoding scheme (e.g., a first MCS value, a first MCS scheme) and including a second set of CBGs that are encoded using a second encoding scheme (e.g., a second MCS value or scheme different from the first MCS value or scheme). In such cases, the UE may transmit feedback for the first set of CBGs and the second set of CBGs using different feedback mechanisms.

In some examples, the UE may be configured to adapt a HARQ feedback reporting scheme based on the types of encoding schemes used to encode the CBGs of the TB. For example, the number of bits in a HARQ feedback report may be associated with the different MCSs used to encode the TB. In some examples, different feedback occasions (e.g., physical uplink control channel (PUCCH) resources) may be used to transmit feedback reports for the CBGs corresponding to the different encoding schemes. In some examples, the UE may transmit different types of feedback reports for the CBGs corresponding to the different encoding schemes. As such, the UE may indicate to the base station which groups of CBGs were successfully decoded using different reporting schemes for groups of CBGs associated with different encoding schemes (e.g., having different MCS values) and thus, the base station may avoid retransmitting successfully received CBGs of a TB encoded with multiple MCS values more efficiently.

A method is described. The method may include receiving, from a base station via control signaling, a feedback configuration for reporting feedback for TBs encoded with at least two encoding schemes, receiving a TB including a set of multiple CBGs, where a first subset of CBGs of the set of multiple CBGs are encoded using a first encoding scheme and a second subset of CBGs of the set of multiple CBGs are encoded using a second encoding scheme different from the first encoding scheme, and transmitting, according to the feedback configuration, a first feedback report for the first subset of CBGs corresponding to the first encoding scheme and a second feedback report for the second subset of CBGs corresponding to the second encoding scheme based on determining whether each of the set of multiple CBGs of the received TB are decoded by a UE.

An apparatus is described. The apparatus may include a memory and a processor coupled with the memory and configured to receive, from a base station via control signaling, a feedback configuration for reporting feedback for TBs encoded with at least two encoding schemes, receive a TB including a set of multiple CBGs, where a first subset of CBGs of the set of multiple CBGs are encoded using a first encoding scheme and a second subset of CBGs of the set of multiple CBGs are encoded using a second encoding scheme different from the first encoding scheme, and transmit, according to the feedback configuration, a first feedback report for the first subset of CBGs corresponding to the first encoding scheme and a second feedback report for the second subset of CBGs corresponding to the second encoding scheme based on determining whether each of the set of multiple CBGs of the received TB are decoded by the UE.

Another apparatus is described. The apparatus may include means for receiving, from a base station via control signaling, a feedback configuration for reporting feedback for TBs encoded with at least two encoding schemes, means for receiving a TB including a set of multiple CBGs, where a first subset of CBGs of the set of multiple CBGs are encoded using a first encoding scheme and a second subset of CBGs of the set of multiple CBGs are encoded using a second encoding scheme different from the first encoding scheme, and means for transmitting, according to the feedback configuration, a first feedback report for the first subset of CBGs corresponding to the first encoding scheme and a second feedback report for the second subset of CBGs corresponding to the second encoding scheme based on determining whether each of the set of multiple CBGs of the received TB are decoded by the UE.

A non-transitory computer-readable medium storing code is described. The code may include instructions executable by a processor to receive, from a base station via control signaling, a feedback configuration for reporting feedback for TBs encoded with at least two encoding schemes, receive a TB including a set of multiple CBGs, where a first subset of CBGs of the set of multiple CBGs are encoded using a first encoding scheme and a second subset of CBGs of the set of multiple CBGs are encoded using a second encoding scheme different from the first encoding scheme, and transmit, according to the feedback configuration, a first feedback report for the first subset of CBGs corresponding to the first encoding scheme and a second feedback report for the second subset of CBGs corresponding to the second encoding scheme based on determining whether each of the set of multiple CBGs of the received TB are decoded by the UE.

In some examples of the method, apparatuses, and non-transitory computer-readable medium described herein, the first feedback report may be transmitted on a first set of resources and the second feedback report may be transmitted on a second set of resources.

Some examples of the method, apparatuses, and non-transitory computer-readable medium described herein may further include operations, features, means, or instructions for receiving an offset value indicating a set of time resources for transmitting the first feedback report.

Some examples of the method, apparatuses, and non-transitory computer-readable medium described herein may further include operations, features, means, or instructions for transmitting the first feedback report over a first set of frequency resources during the set of time resources indicated by the offset value and transmitting the second feedback report over a second set of frequency resources during the set of time resources indicated by the offset value.

In some examples of the method, apparatuses, and non-transitory computer-readable medium described herein, transmitting the first feedback report and the second feedback report may include operations, features, means, or instructions for transmitting the first feedback report during the set of time resources indicated by the offset value and transmitting the second feedback report during an available set of time resources occurring after the set of time resources.

Some examples of the method, apparatuses, and non-transitory computer-readable medium described herein may further include operations, features, means, or instructions for receiving a set of multiple offset values, where a first offset value of the set of multiple offset values indicates a first number of time resources between receiving the TB and transmitting the first feedback report and a second offset value of the set of multiple offset values indicates a second number of time resources between receiving the TB and transmitting the second feedback report.

In some examples of the method, apparatuses, and non-transitory computer-readable medium described herein, transmitting the first feedback report and the second feedback report may include operations, features, means, or instructions for transmitting the first feedback report over a first set of time resources indicated by the first offset value and transmitting the second feedback report over a second set of time resources indicated by the second offset value.

In some examples of the method, apparatuses, and non-transitory computer-readable medium described herein, the first feedback report may be a first type of feedback report and the second feedback report may be a second type of feedback report.

In some examples of the method, apparatuses, and non-transitory computer-readable medium described herein, at least one of the first type of feedback report or the second type of feedback report may be a turbo-HARQ report.

In some examples of the method, apparatuses, and non-transitory computer-readable medium described herein, the first feedback report includes a feedback indication for the first subset of CBGs and the second feedback report includes a second feedback indication for the second subset of CBGs.

In some examples of the method, apparatuses, and non-transitory computer-readable medium described herein, the first feedback report includes a feedback indication for the first subset of CBGs and the second feedback report includes a corresponding feedback indication for each CBG of the second subset of CBGs.

In some examples of the method, apparatuses, and non-transitory computer-readable medium described herein, the first encoding scheme may be associated with a low value and the second encoding scheme may be associated with a high value.

In some examples of the method, apparatuses, and non-transitory computer-readable medium described herein, the feedback configuration indicates a feedback report type associated with each encoding scheme, a corresponding set of resources for transmitting a feedback report associated with each encoding scheme, or a number of feedback bits for a corresponding feedback report associated with each encoding scheme, or any combination thereof.

In some examples of the method, apparatuses, and non-transitory computer-readable medium described herein, the control signaling may be a medium access control (MAC)-control element (CE) message or a radio resource control (RRC) message.

A method is described. The method may include transmitting, to a UE via control signaling, a feedback configuration for reporting feedback for TBs encoded with at least two encoding schemes, transmitting a TB including a set of multiple CBGs, where a first subset of CBGs of the set of multiple CBGs are encoded using a first encoding scheme and a second subset of CBGs of the set of multiple CBGs are encoded using a second encoding scheme different from the first encoding scheme, and receiving, from the UE, a first feedback report for the first subset of CBGs corresponding to the first encoding scheme and a second feedback report for the second subset of CBGs corresponding to the second encoding scheme where each feedback report indicates whether each of the set of multiple CBGs were decoded by the UE.

An apparatus is described. The apparatus may include a memory and a processor coupled with the memory and configured to transmit, to a UE via control signaling, a feedback configuration for reporting feedback for TBs encoded with at least two encoding schemes, transmit a TB including a set of multiple CBGs, where a first subset of CBGs of the set of multiple CBGs are encoded using a first encoding scheme and a second subset of CBGs of the set of multiple CBGs are encoded using a second encoding scheme different from the first encoding scheme, and receive, from the UE, a first feedback report for the first subset of CBGs corresponding to the first encoding scheme and a second feedback report for the second subset of CBGs corresponding to the second encoding scheme where each feedback report indicates whether each of the set of multiple CBGs were decoded by the UE.

Another apparatus is described. The apparatus may include means for transmitting, to a UE via control signaling, a feedback configuration for reporting feedback for TBs encoded with at least two encoding schemes, means for transmitting a TB including a set of multiple CBGs, where a first subset of CBGs of the set of multiple CBGs are encoded using a first encoding scheme and a second subset of CBGs of the set of multiple CBGs are encoded using a second encoding scheme different from the first encoding scheme, and means for receiving, from the UE, a first feedback report for the first subset of CBGs corresponding to the first encoding scheme and a second feedback report for the second subset of CBGs corresponding to the second encoding scheme where each feedback report indicates whether each of the set of multiple CBGs were decoded by the UE.

A non-transitory computer-readable medium storing code is described. The code may include instructions executable by a processor to transmit, to a UE via control signaling, a feedback configuration for reporting feedback for TBs encoded with at least two encoding schemes, transmit a TB including a set of multiple CBGs, where a first subset of CBGs of the set of multiple CBGs are encoded using a first encoding scheme and a second subset of CBGs of the set of multiple CBGs are encoded using a second encoding scheme different from the first encoding scheme, and receive, from the UE, a first feedback report for the first subset of CBGs corresponding to the first encoding scheme and a second feedback report for the second subset of CBGs corresponding to the second encoding scheme where each feedback report indicates whether each of the set of multiple CBGs were decoded by the UE.

In some examples of the method, apparatuses, and non-transitory computer-readable medium described herein, the first feedback report may be received on a first set of resources and the second feedback report may be received on a second set of resources.

Some examples of the method, apparatuses, and non-transitory computer-readable medium described herein may further include operations, features, means, or instructions for determining that the first feedback report may be associated with the first subset of CBGs and that the second feedback report may be associated with the second subset of CBGs based on receiving the first feedback report on the first set of resources and receiving the second feedback report on the second set of resources.

Some examples of the method, apparatuses, and non-transitory computer-readable medium described herein may further include operations, features, means, or instructions for retransmitting a CBG of the first subset of CBGs, each CBG of the first subset of CBGs, a CBG of the second subset of CBGs, or each CBG of the second subset of CBGs, or any combination thereof, based on determining that the first feedback report may be associated with the first subset of CBGs and that the second feedback report may be associated with the second subset of CBGs.

Some examples of the method, apparatuses, and non-transitory computer-readable medium described herein may further include operations, features, means, or instructions for transmitting an offset value indicating a set of time resources for communicating the first feedback report.

Some examples of the method, apparatuses, and non-transitory computer-readable medium described herein may further include operations, features, means, or instructions for receiving the first feedback report over a first set of frequency resources during the set of time resources indicated by the offset value and receiving the second feedback report over a second set of frequency resources during the set of time resources indicated by the offset value.

In some examples of the method, apparatuses, and non-transitory computer-readable medium described herein, receiving the first feedback report and the second feedback report may include operations, features, means, or instructions for receiving the first feedback report during the set of time resources indicated by the offset value and receiving the second feedback report during an available set of time resources occurring after the set of time resources.

Some examples of the method, apparatuses, and non-transitory computer-readable medium described herein may further include operations, features, means, or instructions for transmitting a set of multiple offset values, where a first offset value of the set of multiple offset values indicates a first number of time resources between transmitting the TB and communicating the first feedback report and a second offset value of the set of multiple offset values indicates a second number of time resources between transmitting the TB and communicating the second feedback report.

In some examples of the method, apparatuses, and non-transitory computer-readable medium described herein, receiving the first feedback report and the second feedback report may include operations, features, means, or instructions for receiving the first feedback report over a first set of time resources indicated by the first offset value and receiving the second feedback report over a second set of time resources indicated by the second offset value.

In some examples of the method, apparatuses, and non-transitory computer-readable medium described herein, the first feedback report may be a first type of feedback report and the second feedback report may be a second type of feedback report.

In some examples of the method, apparatuses, and non-transitory computer-readable medium described herein, at least one of the first type of feedback report or the second type of feedback report may be a turbo-HARQ report.

In some examples of the method, apparatuses, and non-transitory computer-readable medium described herein, the first feedback report includes a feedback indication for the first subset of CBGs and the second feedback report includes a second feedback indication for the second subset of CBGs.

In some examples of the method, apparatuses, and non-transitory computer-readable medium described herein, the first feedback report includes a feedback indication for the first subset of CBGs and the second feedback report includes a corresponding feedback indication for each CBG of the second subset of CBGs.

In some examples of the method, apparatuses, and non-transitory computer-readable medium described herein, the first encoding scheme may be associated with a low value and the second encoding scheme may be associated with a high value.

In some examples of the method, apparatuses, and non-transitory computer-readable medium described herein, the feedback configuration indicates a feedback report type associated with each encoding scheme, a corresponding set of resources for communicating the feedback report associated with each encoding scheme, or a number of feedback bits for a corresponding feedback report associated with each encoding scheme, or any combination thereof.

In some examples of the method, apparatuses, and non-transitory computer-readable medium described herein, the control signaling may be a MAC-CE message or an RRC message.

DETAILED DESCRIPTION

Figure 1:
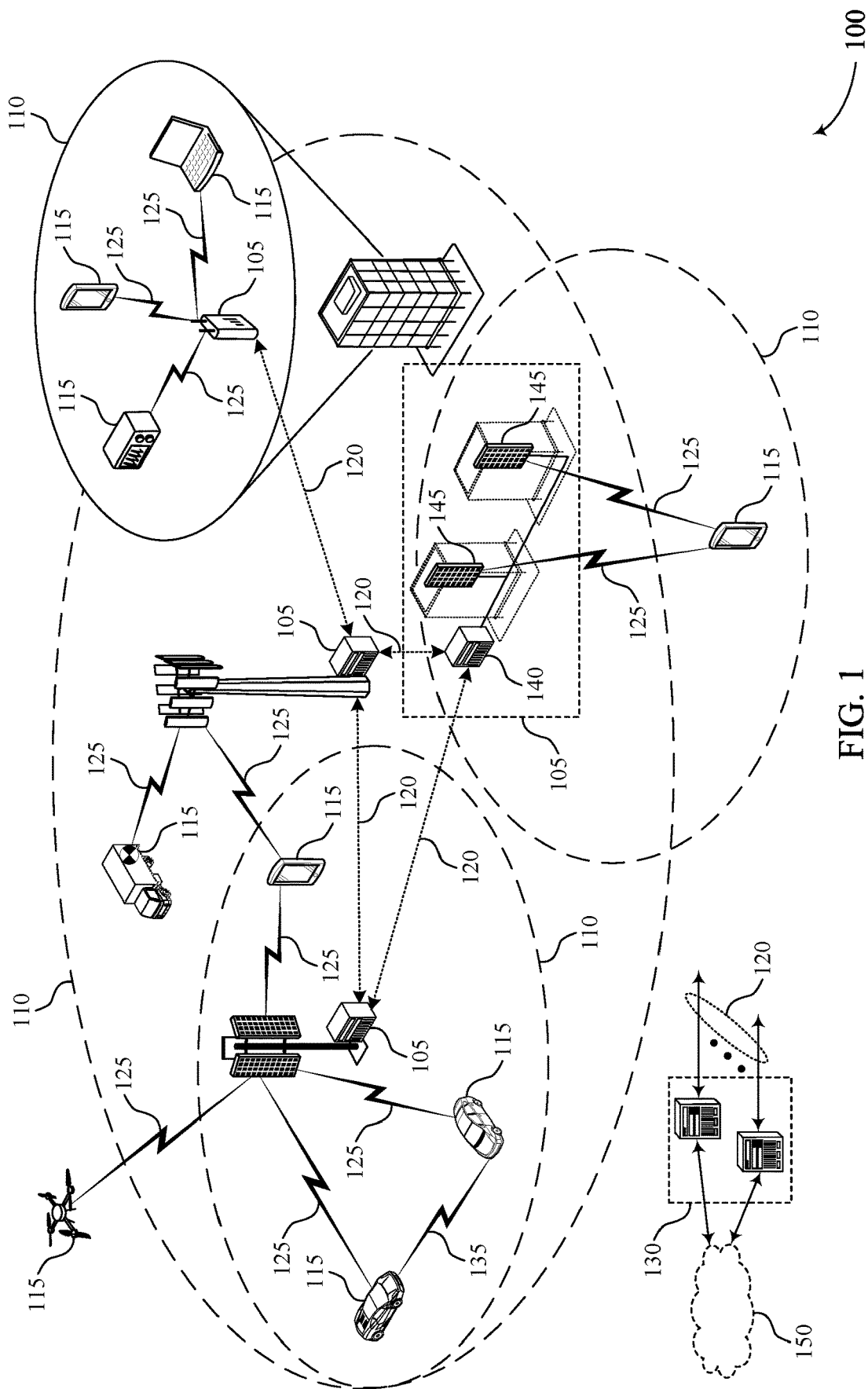
FIG. 1 illustrates an example of a wireless communications system that supports feedback for transport blocks (TBs) with multiple modulation and coding schemes (MCSs) in accordance with aspects of the present disclosure.

In some cases, a user equipment (UE) may receive a transport block (TB) including multiple code block groups (CBGs), where each group of CBGs is encoded with a different encoding scheme (e.g., a different modulation and coding scheme (MCS) value). For example, a base station may adapt to changing channel conditions while transmitting a TB by transmitting a portion of the TB (e.g., a first group of CBGs) using a first encoding scheme (e.g., first MCS value), for example, because the base station may be communicating in a half-duplex communications scheme to account for limited bandwidth. The base station may further transmit a second portion of the TB (e.g., a second group of CBGs) using a second encoding scheme (e.g., second MCS value) if additional bandwidth becomes available, for example, because the base station may switch to communicating in a full duplex communications scheme, or vice versa. That is, a base station may transmit the CBGs of a TB using different MCS values for various reasons, which may be based on service type, one or more measurements, and/or link quality, among other examples.

The UE may transmit a feedback message in response to the downlink TB. The feedback message may include a single bit of feedback per TB or per CBG in the downlink message. In other examples, the feedback message may include multiple bits per TB or per CBG, which may be referred to as multi-bit feedback or other like terminology. The multi-bit feedback may indicate a one-bit acknowledgment (ACK) or negative acknowledgment (NACK) in addition to one or more bits to indicate additional information, for example, related to channel state information (CSI). Such multi-bit feedback (e.g., including ACK/NACK and additional information) may be referred to as a turbo-hybrid automatic repeat request (HARQ) feedback while the single bit of feedback may be referred to as HARQ feedback, single-bit feedback, or other similar terminology.

In some examples, a UE may transmit feedback for CBGs associated with a first type of MCS value (e.g., low MCS values) using a first feedback scheme and may transmit feedback for CBGs associated with a second type of MCS value (e.g., high MCS values) using a second type of feedback scheme to efficiently utilize communications resources among other advantages. In particular, the UE may be configured to adapt a HARQ feedback scheme to efficiently provide feedback for multi-MCS TBs, for example, because HARQ feedback schemes used for single-MCS TBs may not efficiently translate to multi-MCS TBs.

As described herein, a UE that is configured to receive a TB with multiple CBGs transmitted using different MCS values may be configured to transmit a HARQ report for each group of CBGs transmitted with a different MCS value. That is, the UE may transmit a first report for a group of CBGs encoded with a first MCS and may transmit a second report for a group of CBGs encoded with a second MCS. In some examples, the UE may transmit the HARQ reports using different feedback resources (e.g., physical uplink control channel (PUCCH) occasions) that correspond to (and thus indicate to the base station) the CBGs having the first MCS value and the CBGs having the second MCS value, respectively. In some examples, the UE may transmit the HARQ reports using different HARQ report types that correspond to the CBGs having the first MCS value and the CBGs having the second MCS value, respectively. For example, the UE may transmit a first HARQ report type (e.g., legacy HARQ feedback with fewer or no additional bits, a single-bit HARQ feedback) for CBGs transmitted with a relatively low MCS (e.g., an MCS having a relatively low coding rate, an MCS corresponding to some MCS index) and may transmit a second HARQ report type (e.g., turbo-HARQ, turbo-HARQ with additional bits, multi-bit HARQ feedback) for CBGs transmitted with a relatively high MCS (e.g., an MCS having a relatively high modulation order, an MCS corresponding to some MCS index).

In some examples, if the UE receives a TB with a set of groups of CBGs each having different MCS values, the UE may transmits a one bit ACK/NACK HARQ feedback report for each group of CBGs or may transmit a one bit ACK/NACK for one or more groups of CBGs (e.g., having a relatively low MCS value) and may transmit a CBG-level (e.g., one bit for each CBG) HARQ feedback report for other groups (e.g., having a relatively high MCS value). For example, a base station may utilize a relatively low MCS for one group of CBGs and a relatively high MCS for a second group of CBGs, where the relatively high-MCS-CBGs may be more vulnerable to errors than low-MCS-CBGs that may be relatively more likely to be decoded successfully (e.g., and thus multi-bit feedback may be an inefficient use of resources for high success rate CBGs).

In some examples, the UE may transmit a one-bit feedback report corresponding to the CBGs encoded using the relatively low MCS and may transmit a feedback report including additional information (e.g., a turbo-HARQ feedback report which may in some examples include CSI, among other examples) corresponding to the CBGs encoded using the relatively high MCS. By transmitting feedback corresponding to the groups of CGBs each having a corresponding MCS value, a UE may conserve resources used for transmitting feedback and enable techniques that avoid a retransmission of successfully decoded CBGs.

Aspects of the disclosure are initially described in the context of wireless communications systems. Aspects of the disclosure are then described in the context of a feedback structure and a process flow. Aspects of the disclosure are further illustrated by and described with reference to apparatus diagrams, system diagrams, and flowcharts that relate to feedback (e.g., HARQ feedback) for TBs with multiple MCSs.

FIG. 1 illustrates an example of a wireless communications system 100 that supports feedback for TBs with multiple MCSs in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval. A UE 115 may transmit HARQ feedback according to a number of parameters including a physical downlink shared channel (PDSCH)-ACK/NACK timing, k1 that defines a time gap between PDSCH transmission by the base station 105 including one or more TBs and the reception of the PUCCH from the UE 115 that carries ACK/NACK for the PDSCH. That is, k1 indicates a time delay between a PDSCH occasion and a PUCCH occasion.

The UEs 115 and the base stations 105 may support communications using different MCS values which define how many bits may be transmitted per resource (e.g., resource element (RE)). An MCS chosen for communication may depend on radio link quality. For example, the better channel quality, the higher the MCS value that may be used, for example, and vice versa. An MCS value may include a code rate and may include a modulation scheme. For example, the modulation scheme (e.g., QPSK, 16QAM, 64QAM and 256QAM) may define how many bits may be carried by a single RE. A QPSK scheme may include 2 bits per RE, 16QAM may include 4 bits per RE, 64QAM may include 6 bits per RE and 256QAM may include 7 bits per RE. A code rate may indicate a portion of a data stream that is used to transmit usable data.

In some examples, a base station 105 may transmit a TB to a UE 115, where in some examples, the TB may include multiple code blocks grouped into a set of CBGs each of which may be encoded with a same MCS value. The UE 115 may attempt to decode each code block and may provide HARQ feedback indicating whether one or more portions of the TB are associated with a decoding error. In some examples, the HARQ feedback may include additional information and may be referred to as a turbo-HARQ feedback. For example, turbo-HARQ feedback may include a first feedback bit and may include an additional bit indicating, for example, whether to continue communications using the same MCS value or to increase it or decrease the MCS value, an error probability of the decoding at the UE, channel quality information, or information regarding a coding iteration, among other examples. In some examples, turbo-HARQ feedback may be provided in response to receiving a TB including a set of CBGs each encoded with the same MCS value.

In some wireless communications systems, such as wireless communications system 100, for example, the base station 105 may transmit TB including a first set of CBGs encoded with a first MCS value and including at least a second set of CBGs encoded with a second MCS value. For example, the TB may be mapped for transmission in time and frequency resources such that some CBGs may be mapped to resources intended for half-duplex communications and some CBGs may be mapped to resources intended for full-duplex communications. In such examples, a first MCS value may be more appropriate for the CBGs mapped to the half-duplex resources and a second, different MCS value may be more appropriate for the CBGs mapped to the full-duplex resources. In some other examples, two or more different MCS values may be used in response to varying channel conditions or other transmission parameters, among other examples.

A UE 115 may receive control signaling from a base station 105 that includes a feedback configuration for reporting feedback for TBs encoded with at least two encoding schemes (e.g., MCS values). The base station 105 may transmit, and the UE 115 may receive and attempt to decode, a TB including a plurality of CBGs having a first subset of CBGs of the plurality of CBGs encoded using a first encoding scheme and a second subset of CBGs of the plurality of CBGs encoded using a second encoding scheme. In response, the UE 115 may transmit a first feedback report for the first subset of CBGs corresponding to the first encoding scheme and a second feedback report for the second subset of CBGs corresponding to the second encoding scheme according to the feedback configuration. The feedback reports may indicate whether each of the plurality of CBGs of the received TB are decoded by the UE 115.

In some examples, the feedback configuration may indicate that the UE 115 may use an offset value (e.g., k1 value) for each of the two or more groups of CBGs encoded with different encoding schemes. The offset value, k1, may correspond to an amount of time between a received downlink message and a scheduled time for transmitting feedback for that downlink message. In some examples, the feedback configuration may indicate that the UE 115 may multiplex the HARQ feedback reports for the groups of CBGs and transmit them to the base station 105 according to a single offset value. In some examples, the feedback configuration may indicate that the UE 115 may transmit a HARQ feedback report for CBGs encoded with an encoding scheme associated with a relatively high encoding value during a first feedback occasion (e.g., PUCCH occasion) and may defer a HARQ feedback report for CBGs encoded with an encoding scheme associated with a relatively low encoding value to a next available feedback occasion (e.g., PUCCH occasion).

The feedback configuration may indicate that the UE 115 may be configured to report different HARQ feedback report types for each group of CBGs. For example, the UE 115 may transmit a HARQ feedback report for CBGs transmitted with a relatively low encoding scheme value while the UE 115 may transmit a turbo-HARQ feedback report for CBGs transmitted with a relatively high encoding scheme value. In some other examples, the UE 115 may transmit a turbo-HARQ feedback report having a first number of (e.g., relatively fewer) additional bits for CBGs transmitted with a relatively low encoding scheme value while the UE 115 may transmit a turbo-HARQ feedback report having a second number of (e.g., relatively more) additional bits for CBGs transmitted with a relatively high encoding scheme value.

In some examples, if the UE 115 receives a TB with multiple groups of CBGs with different MCS values, the feedback configuration may indicate that the UE 115 transmits a one bit ACK/NACK for each group of CBGs or that the UE transmits a one bit ACK/NACK for one or more groups of CBGs (e.g., encoded with a first encoding scheme) and transmits a CBG-level HARQ feedback report (e.g., a granular ACK/NACK report, a one bit ACK NACK for each group, an ACK/NACK indicating a decoding status of each CBG) for other groups.

Figure 2:
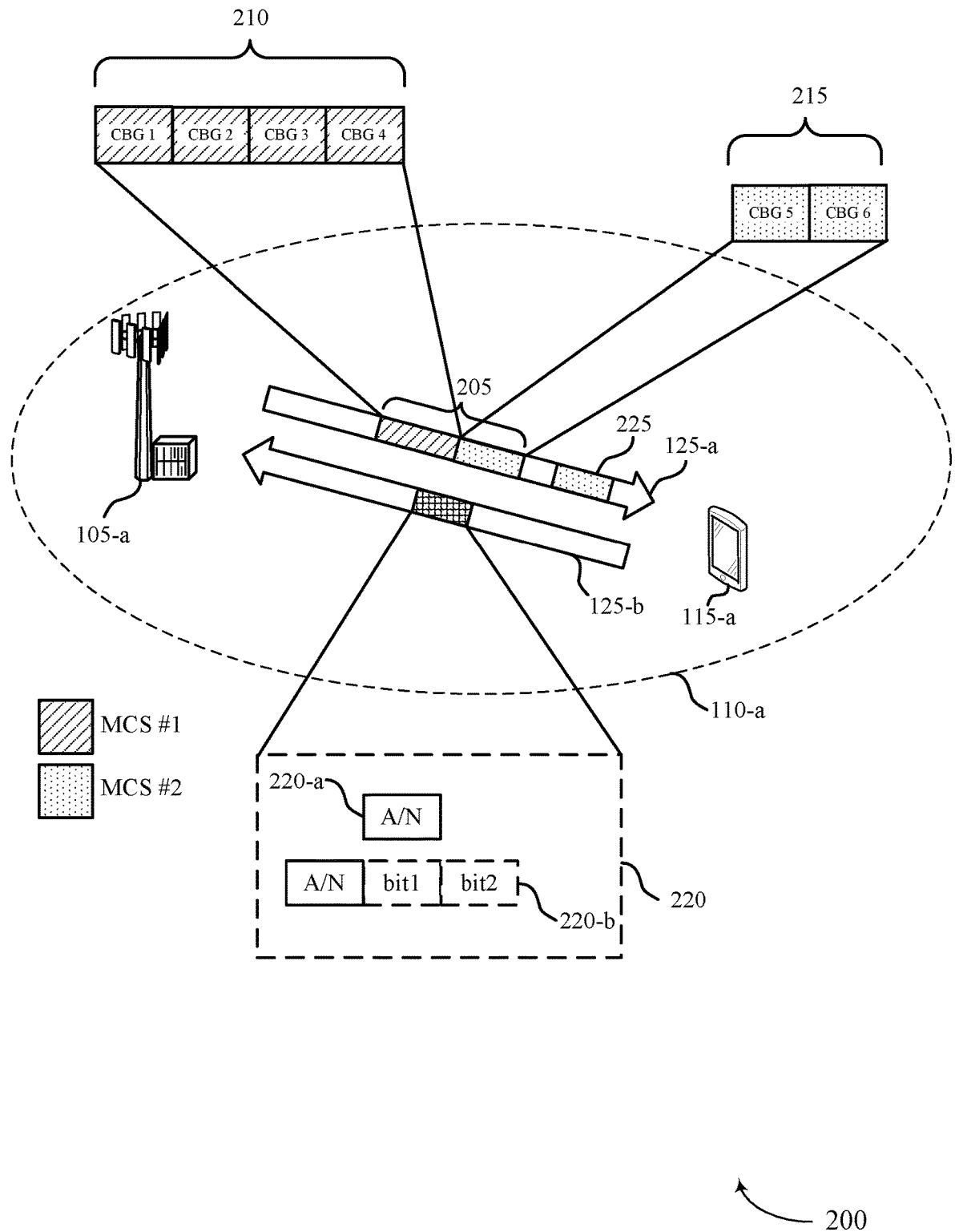
FIG. 2 illustrates an example of a wireless communications system that supports feedback for TBs with multiple MCSs in accordance with aspects of the present disclosure.

FIG. 2 illustrates an example of a wireless communications system 200 that supports feedback for TBs with multiple MCSs in accordance with aspects of the present disclosure. In some examples, wireless communications system 200 may implement aspects of wireless communications system 100. Wireless communications system 200 may include a base station 105-a and a UE 115-a which may be examples of the corresponding devices as described with reference to FIG. 1.

The UE 115-a and the base station 105-a may be communicating in a coverage area 110-a. In some cases, the UE 115-a may receive a TB 205 including one or more groups of CBGs from the base station 105 via communication link 125-a. For example, the TB 205 may include a first set of CBGs 210 encoded with a first encoding scheme (e.g., a first MCS having a first MCS value) and a second set of CBGs 215 encoded with a second, different encoding scheme (e.g., a second MCS having a different MCS value). For example, the base station 105-a may adapt to changing channel conditions while transmitting TB 205 by transmitting the first set of CBGs 210 using the first MCS value, for example, because the base station 105-a may be communicating in half-duplex communications to account for limited bandwidth and further transmitting the second set of CBGs 215 using a second MCS value if additional bandwidth becomes available (e.g., because the base station 105-a may switch to communicating in a full duplex communications scheme, or vice versa). That is, the base station 105-a may transmit the groups of CBGs of TB 205 using different MCS values to account for various channel conditions including available bandwidth.

In wireless communications system 200, the UE 115-a may transmit a feedback report 220 via communication link 125-b in response to receiving the TB 205. For example, the UE 115-a may detect an error associated with the decoding of one or more CBGs of the TB 205 and the UE 115-a may report a feedback message with a NACK indicating that the TB 205 was received in error. Base station 105-a may respond by retransmitting the entire TB 205.

In some examples, the feedback report 220 may include a single bit of feedback 220-a per TB or per CBG or the feedback report 220 may include multi-bit feedback 220-b per TB or CBG. For example, the multi-bit feedback 220-b may indicate a one-bit ACK/NACK and may additionally indicate one or more bits of additional information, for example, related to CSI, coding rate, or error rate, among other examples. Multi-bit feedback 220-b may be referred to as turbo-HARQ while the single bit feedback 220-a may be referred to as HARQ. In some examples, the UE 115-a may transmit feedback for the first set of CBGs 210 associated with a first type of MCS value (e.g., low MCS values) using a first feedback report and may transmit feedback for the second set of CBGs 215 associated with a second type of MCS value (e.g., high MCS value) using a second feedback report to efficiently use communications resources that may be otherwise wasted when providing feedback as if the TB were encoded with a single MCS.

The UE 115-a may be configured to adapt a feedback reporting scheme to provide feedback for the multi-MCS TB 205. For example, the UE 115-a may be configured to receive TB 205 including two or more CBGs 210 that are encoded with multiple MCS values (e.g., a first set of CBGs 210 that have a first MCS and a second set of CBGs 210 that have a second MCS). Based on receiving the feedback configuration 225, the UE 115-a may be further configured to transmit a feedback report 220 for each of the first set of CBGs 210 and the second set of CBGs 215. In some examples, the UE 115-a may transmit the HARQ reports using different resources that correspond to (and thus indicate to base station 105-a) the first set of CBGs 210 and the second set of CBGs 215, respectively. In some examples, UE 115-a may transmit a first feedback report type (e.g., legacy HARQ, a single-bit feedback message) for the first set of CBGs and transmit a second feedback report type (e.g., turbo-HARQ, turbo-HARQ with additional bits, a multi-but feedback message) for the second set of CBGs 215, or vice versa.

The wireless communications system 200 may support techniques for improved communication reliability and greater spectral efficiency, among other benefits. For example, the techniques described herein may enable the UE 115-a to transmit feedback for different groups of CBGs based on the associated encoding scheme which may decrease the likelihood of a successfully received set of CBGs being retransmitted. Moreover, the described techniques may the increase spectral efficiency of the UE 115-a when experiencing variability in channel conditions during transmission.

Figure 3:
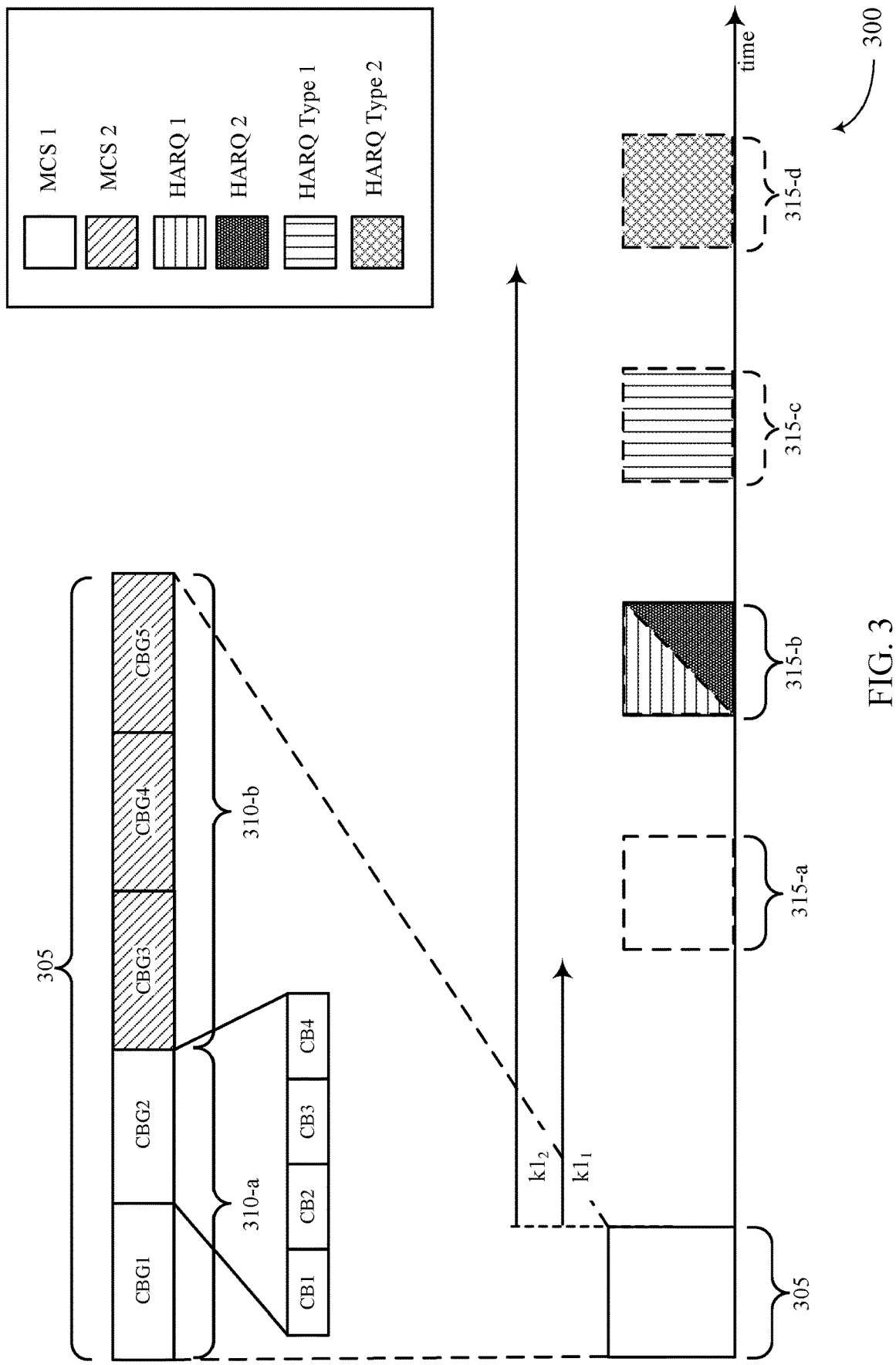
FIG. 3 illustrates an example of a feedback structure that supports feedback for TBs with multiple MCSs in accordance with aspects of the present disclosure.

FIG. 3 illustrates an example of a feedback structure 300 that supports feedback for TBs with multiple MCSs in accordance with aspects of the present disclosure. In some examples, the feedback structure 300 may implement or be implemented by aspects of wireless communications system 100 or 200, for example, may be implemented by a UE 115 and/or a base station 105 as described with reference to FIGS. 1 and 2 and may be associated with a feedback configuration as also described with reference to FIGS. 1 and 2. Each of the examples provided herein may be implemented individually or in conjunction with one or more examples. The example portrayed in FIG. 3 is meant to illustrate a number of feedback configurations and is not limiting to one embodiment or one combination of embodiments.

The feedback structure 300 may include a TB 305 including a first set of CBGs 310-a encoded using a first encoding scheme (e.g., MCS 1) and a second set of CBGs 310-b encoded using a second encoding scheme (e.g., MCS 2). It is understood that, although the TB 305 is shown as including two sets of CBGs 310 (e.g., the first set of CBGs 310-a, the second set of CBGs 310-b) encoded using respective encoding schemes (e.g., respective MCS values), the TB 305 may include any number of CBGs 310 encoded with different encoding schemes. For example, the TB 305 may include three or more sets of CBGs 310 that are encoded using different encoding schemes. Thus, the examples provided herein should not be considered limiting to the scope of the claims or the disclosure. The feedback structure 300 may further include a number of feedback occasions 315 (e.g., PUCCH occasions) for transmitting feedback reports associated with the TB 305.

A UE may receive a feedback configuration that indicates one or more methods for transmitting feedback associated with the TB 305 encoded with more than one encoding scheme. Further, the UE may receive a downlink message that includes the TB 305. In some examples, the UE may receive an indication of one or more offset values (k1) for transmitting feedback from a base station. For example, the offset value may indicate a time duration between receiving the TB 305 and a corresponding uplink resource in which the UE may transmit feedback for the TB 305. In some example, the base station may identify which TB some received feedback corresponds to, which may be based on the resource on which the feedback is transmitted.

In some examples, the feedback configuration may indicate that the UE may transmit a feedback report for the first set of CBGs 310-a according the $k1_1$ value at feedback occasion 315-a and may indicate that the UE may transmit a feedback report for the second set of CBGs 310-b according the $k1_2$ value at feedback occasion 315-d based on the first set of CBGs being associated with the MCS 1 and the second set of CBGs being associated with the MCS 2. In some examples, the feedback configuration may indicate that the UE may multiplex the HARQ feedback reports (e.g., HARQ 1 and HARQ 2) for the first set of CBGs 310-a and the second set of CBGs 310-b and transmit them to the base station according to a single offset value, $k1_1$, for example, at the feedback occasion 315-a. In some examples, MCS 1 may be associated with a relatively lower MCS value than MCS 2, and the feedback configuration may indicate that the UE may transmit a feedback report for the second set of CBGs 310-b encoded with MCS 1 during a first feedback occasion (e.g., 315-a) and may defer the feedback report for the first set of CBGs 310-a (and MCS 1) to a subsequent and/or next available feedback occasion (e.g., feedback occasion 315-b, feedback occasion 315-c).

In some examples, the feedback configuration may indicate that the UE may be configured to report different HARQ feedback report types for each group of CBGs. For example, MCS 1 may be associated with a lower MCS value than MCS 2 and the UE may transmit (e.g., at feedback occasion 315-c) a first type of feedback report (e.g., HARQ type 1) for the first set of CBGs 310-a and may transmit (e.g., at feedback occasion 315-d) a second type of feedback report (e.g., HARQ type 2, which may be an example of turbo-HARQ feedback) for the second set of CBGs 310-b. In some other examples, the UE may transmit a same type of feedback for each of the sets of CBGs 310, but a first feedback report for the first set of CBGs 310-a may include a fewer number of additional feedback bits than a second feedback report for the second set of CBGs 310-b.

In some examples, the feedback configuration may indicate that the feedback report may include a one bit ACK/NACK for each of the first set of CBGs 310-a and the second set of CBGs 310-b. In some examples, that the feedback configuration may indicate that the first feedback report may include a one bit ACK/NACK for the first set of CBGs 310-a (e.g., encoded with a lower value MCS 1) and the second feedback report may include a CBG-level HARQ-ACK report (e.g., a granular ACK/NACK report, a one bit ACK NACK for each group, an ACK/NACK indicating a decoding status of each CBG) for the second set of CBGs 310-b (e.g., encoded with a higher value MCS 2). In such ways, the feedback configuration may provide a UE with an efficient mechanism for providing feedback for a TB encoded with two or more MCS values.

Figure 4:
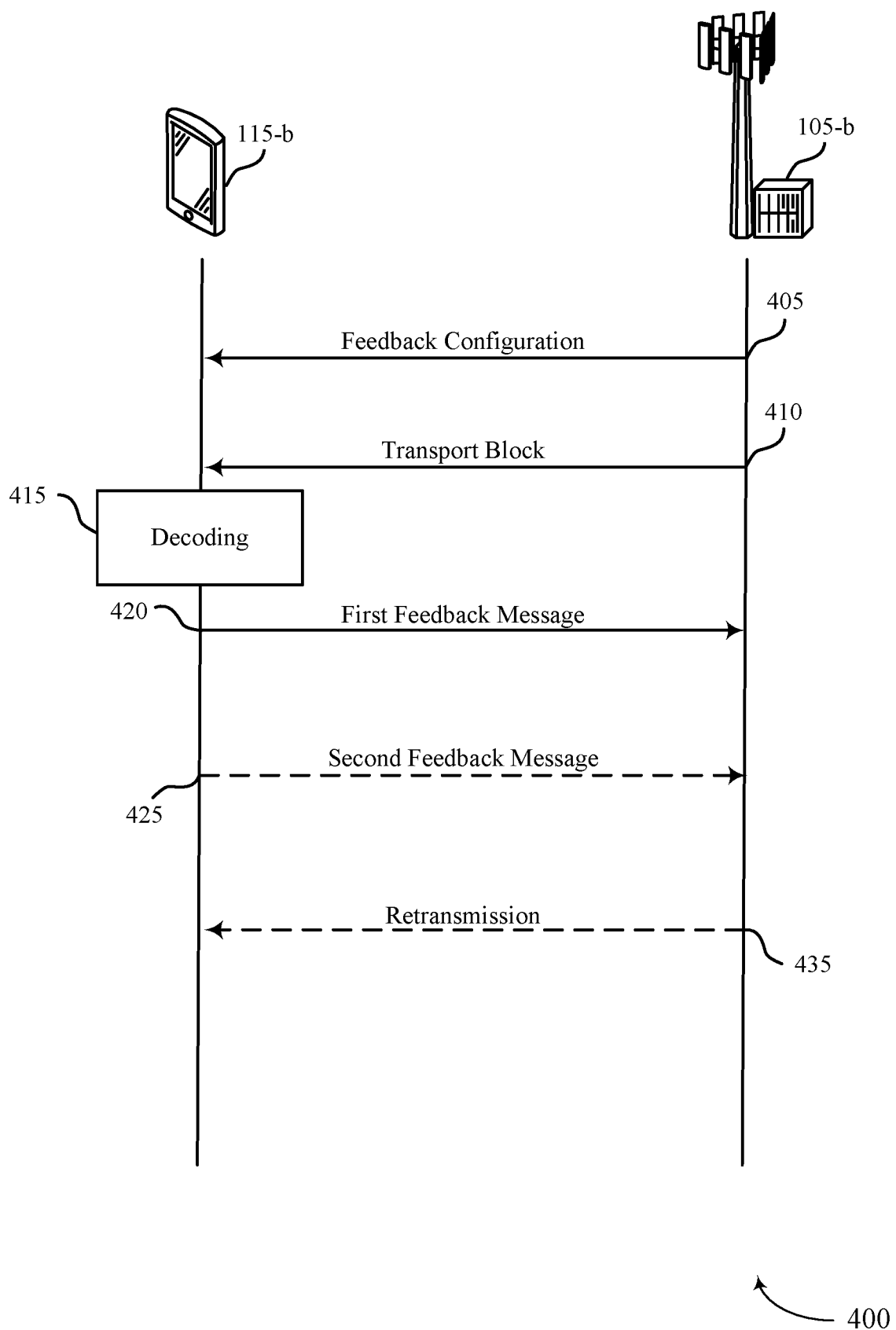
FIG. 4 illustrates an example of a process flow in a system that supports feedback for TBs with multiple MCSs in accordance with aspects of the present disclosure.

FIG. 4 illustrates an example of a process flow 400 in a system that supports feedback for TBs with multiple MCSs in accordance with aspects of the present disclosure. The process flow 400 may implement or be implemented by aspects of wireless communications system 100 or 200. For example, the process flow 400 may illustrate operations between a UE 115-b and a base station 105-b, which may be examples of a UE 115 and a base station 105, as described with reference to FIG. 1. In the following description of the process flow 400, the operations between the UE 115-b and the base station 105-b may be transmitted in a different order than the example order shown, or the operations performed by the UE 115-b and the base station 105-b may be performed in different orders or at different times. Some operations may also be omitted from the process flow 400, and other operations may be added to the process flow 400.

At 405, the base station 105-b may transmit, to the UE 115-b, control signaling including a feedback configuration for reporting feedback for TBs encoded with at least two encoding schemes (e.g., MCS values). The control signaling may be transmitting via RRC signaling or MAC-CE signaling, among other examples. The control signaling may indicate one or more parameters for providing feedback by the UE 115-*b*. The feedback configuration may indicate one or more offset values (e.g., k1 values) for reporting feedback for each of two or more groups of CBGs encoded with different encoding schemes. In some examples, the feedback configuration may indicate that the UE 115-*b* may multiplex the HARQ feedback reports for the groups of CBGs and transmit the feedback reports to the base station 105-*b* according to a single offset value. In some examples, the feedback configuration may indicate that the UE 115-*b* may transmit a HARQ feedback report for CBGs encoded with an encoding scheme associated with a relatively high encoding value during a first feedback occasion (e.g., PUCCH occasion) and may defer a HARQ feedback report for CBGs encoded with an encoding scheme associated with a relatively low encoding value to a next available feedback occasion.

In some examples, the feedback configuration may indicate that the UE 115-*b* may be configured to report different HARQ feedback report types for each group of CBGs. For example, the UE 115-*b* may be configured by the feedback configuration to transmit a HARQ feedback report for CBGs transmitted with a relatively low encoding scheme value and the UE 115-*b* may also be configured to transmit a turbo-HARQ feedback report for CBGs transmitted with a relatively high encoding scheme value. In some other examples, the UE 115-*b* may be configured by the feedback configuration to transmit a turbo-HARQ feedback report having a first number of (e.g., relatively fewer) additional bits for CBGs transmitted with a relatively low encoding scheme value while the UE 115-*b* may transmit a turbo-HARQ feedback report having a second number of (e.g., relatively more) additional bits for CBGs transmitted with a relatively high encoding scheme value.

In some examples, the UE 115-*b* may receive a TB with multiple groups of CBGs with different MCS values, the feedback configuration may configure the UE 115-*b* to transmit a one bit ACK/NACK for each group of CBGs or to transmit a one bit ACK/NACK for one or more groups of CBGs (e.g., encoded with a first encoding scheme) and transmit a CBG-level HARQ-ACK report (e.g., a granular ACK/NACK report, a one bit ACK NACK for each group, an ACK/NACK indicating a decoding status of each CBG) for other groups.

At 410, The base station 105-*b* may transmit a TB to the UE 115-*b* including at least a first set of CBGs encoded with a first encoding scheme and a second set of CBGs encoded with a second encoding scheme.

At 415, the UE 115-*b* may attempt to decode the TBs and may determine whether one or more of the CBGs is associated with a decoding error and at 420, may transmit a first feedback message, for example, including a feedback report according to the feedback configuration that indicates whether one or more of the CBGs is associated with a decoding error. Optionally, in some examples and according to the feedback configuration, the UE 115-*b* may transmit a second feedback message including a second feedback report. For example, the UE 115-*b* may transmit a feedback report for first set of CBGs and the second set of CBGs over a first set of resources at 420, in some examples, indicated by an offset value according to the feedback configuration. In other examples, the UE 115-*b* may transmit a feedback report for the first set of CBGs over a first set of resources at 420, in some examples, indicated by a first offset value and the UE 115-*b* may transmit a feedback report for the second set of CBGs over a second set of resources at 425, in some examples, indicated by a second offset value according to the feedback configuration. In some examples, the first report may be different from the second report and may include a different feedback granularity, a different feedback report type, or a different number of bits in the feedback report, among other examples.

At 435, the base station 105-*b* may determine to retransmit one or more of the CBGs of the TB based on the first feedback message or, in some cases, the second feedback message, or both. As such, the base station 105-*b* may retransmit the one or more CBGs of the TB.

Figure 5:
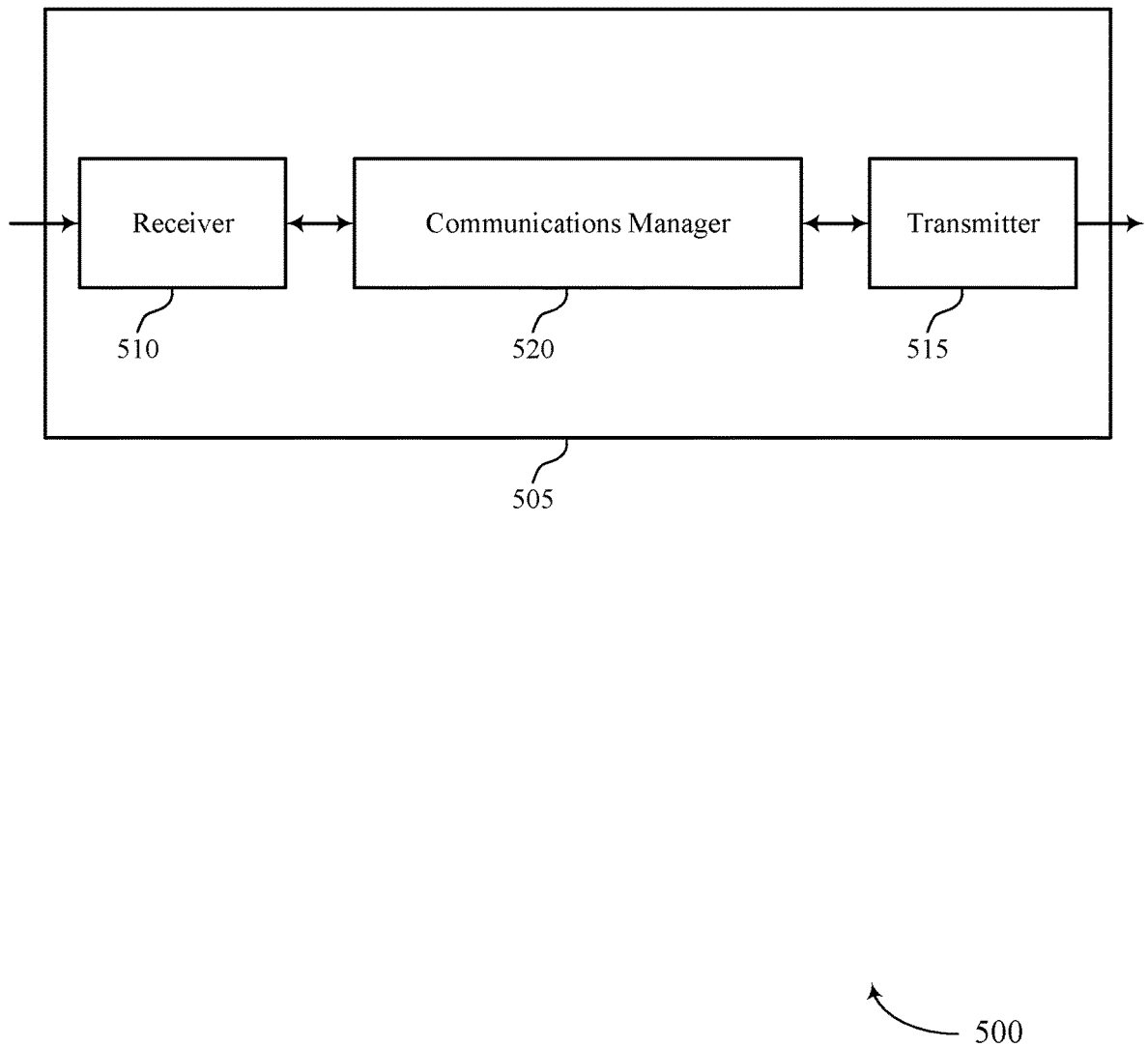
FIGS. 5 and 6 show block diagrams of devices that support feedback for TBs with multiple MCSs in accordance with aspects of the present disclosure.

FIG. 5 shows a block diagram 500 of a device 505 that supports feedback for TBs with multiple MCSs in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to feedback for TBs with multiple MCSs). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to feedback for TBs with multiple MCSs). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of feedback for TBs with multiple MCSs as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

For example, the communications manager 520 may be configured as or otherwise support a means for receiving, from a base station via control signaling, a feedback configuration for reporting feedback for TBs encoded with at least two encoding schemes. The communications manager 520 may be configured as or otherwise support a means for receiving a TB including a set of multiple CBGs, where a first subset of CBGs of the set of multiple CBGs are encoded using a first encoding scheme and a second subset of CBGs of the set of multiple CBGs are encoded using a second encoding scheme different from the first encoding scheme. The communications manager 520 may be configured as or otherwise support a means for transmitting, according to the feedback configuration, a first feedback report for the first subset of CBGs corresponding to the first encoding scheme and a second feedback report for the second subset of CBGs corresponding to the second encoding scheme based on determining whether each of the set of multiple CBGs of the received TB are decoded by the UE.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for efficient utilization of communication resources, among other examples.

Figure 6:
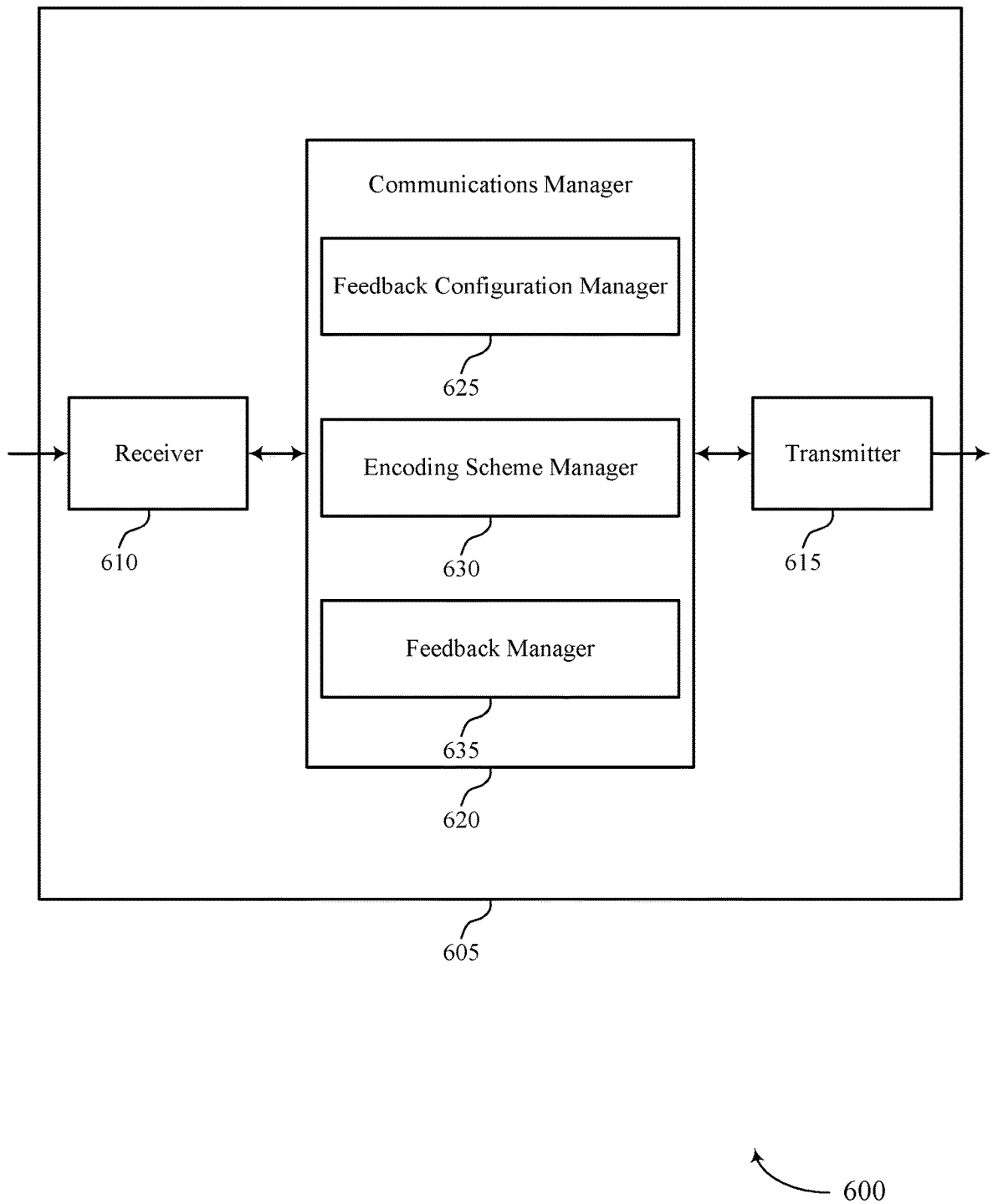

FIG. 6 shows a block diagram 600 of a device 605 that supports feedback for TBs with multiple MCSs in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to feedback for TBs with multiple MCSs). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to feedback for TBs with multiple MCSs). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of feedback for TBs with multiple MCSs as described herein. For example, the communications manager 620 may include a feedback configuration manager 625, an encoding scheme manager 630, a feedback manager 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The feedback configuration manager 625 may be configured as or otherwise support a means for receiving, from a base station via control signaling, a feedback configuration for reporting feedback for TBs encoded with at least two encoding schemes. The encoding scheme manager 630 may be configured as or otherwise support a means for receiving a TB including a set of multiple CBGs, where a first subset of CBGs of the set of multiple CBGs are encoded using a first encoding scheme and a second subset of CBGs of the set of multiple CBGs are encoded using a second encoding scheme different from the first encoding scheme. The feedback manager 635 may be configured as or otherwise support a means for transmitting, according to the feedback configuration, a first feedback report for the first subset of CBGs corresponding to the first encoding scheme and a second feedback report for the second subset of CBGs corresponding to the second encoding scheme based on determining whether each of the set of multiple CBGs of the received TB are decoded by the UE.

Figure 7:
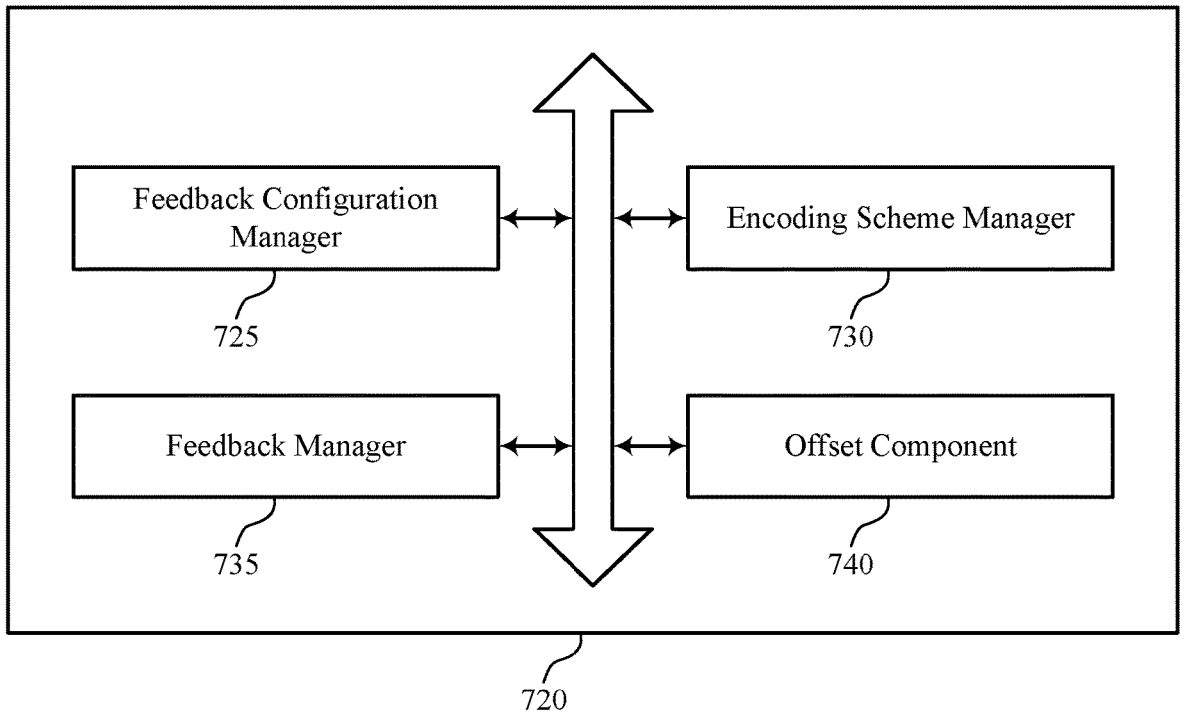
FIG. 7 shows a block diagram of a communications manager that supports feedback for TBs with multiple MCSs in accordance with aspects of the present disclosure.

FIG. 7 shows a block diagram 700 of a communications manager 720 that supports feedback for TBs with multiple MCSs in accordance with aspects of the present disclosure. The communications manager 720 may be an example of aspects of a communications manager 520, a communications manager 620, or both, as described herein. The communications manager 720, or various components thereof, may be an example of means for performing various aspects of feedback for TBs with multiple MCSs as described herein. For example, the communications manager 720 may include a feedback configuration manager 725, an encoding scheme manager 730, a feedback manager 735, an offset component 740, or any combination thereof. Each of these components may communicate, directly or indirectly, with one another (e.g., via one or more buses).

The feedback configuration manager 725 may be configured as or otherwise support a means for receiving, from a base station via control signaling, a feedback configuration for reporting feedback for TBs encoded with at least two encoding schemes. The encoding scheme manager 730 may be configured as or otherwise support a means for receiving a TB including a set of multiple CBGs, where a first subset of CBGs of the set of multiple CBGs are encoded using a first encoding scheme and a second subset of CBGs of the set of multiple CBGs are encoded using a second encoding scheme different from the first encoding scheme. The feedback manager 735 may be configured as or otherwise support a means for transmitting, according to the feedback configuration, a first feedback report for the first subset of CBGs corresponding to the first encoding scheme and a second feedback report for the second subset of CBGs corresponding to the second encoding scheme based on determining whether each of the set of multiple CBGs of the received TB are decoded by the UE.

In some examples, the first feedback report is transmitted on a first set of resources and the second feedback report is transmitted on a second set of resources.

In some examples, the offset component 740 may be configured as or otherwise support a means for receiving an offset value indicating a set of time resources for transmitting the first feedback report.

In some examples, the feedback manager 735 may be configured as or otherwise support a means for transmitting the first feedback report over a first set of frequency resources during the set of time resources indicated by the offset value. In some examples, the feedback manager 735 may be configured as or otherwise support a means for transmitting the second feedback report over a second set of frequency resources during the set of time resources indicated by the offset value.

In some examples, to support transmitting the first feedback report and the second feedback report, the feedback manager 735 may be configured as or otherwise support a means for transmitting the first feedback report during the set of time resources indicated by the offset value. In some examples, to support transmitting the first feedback report and the second feedback report, the feedback manager 735 may be configured as or otherwise support a means for transmitting the second feedback report during an available set of time resources occurring after the set of time resources.

In some examples, the offset component 740 may be configured as or otherwise support a means for receiving a set of multiple offset values, where a first offset value of the set of multiple offset values indicates a first number of time resources between receiving the TB and transmitting the first feedback report and a second offset value of the set of multiple offset values indicates a second number of time resources between receiving the TB and transmitting the second feedback report.

In some examples, to support transmitting the first feedback report and the second feedback report, the feedback manager 735 may be configured as or otherwise support a means for transmitting the first feedback report over a first set of time resources indicated by the first offset value. In some examples, to support transmitting the first feedback report and the second feedback report, the feedback manager 735 may be configured as or otherwise support a means for transmitting the second feedback report over a second set of time resources indicated by the second offset value.

In some examples, the first feedback report is a first type of feedback report and the second feedback report is a second type of feedback report.

In some examples, at least one of the first type of feedback report or the second type of feedback report is a turbo-hybrid automatic request report.

In some examples, the first feedback report includes a feedback indication for the first subset of CBGs and the second feedback report includes a second feedback indication for the second subset of CBGs.

In some examples, the first feedback report includes a feedback indication for the first subset of CBGs and the second feedback report includes a corresponding feedback indication for each CBG of the second subset of CBGs.

In some examples, the first encoding scheme is associated with a low value and the second encoding scheme is associated with a high value.

In some examples, the feedback configuration indicates a feedback report type associated with each encoding scheme, a corresponding set of resources for transmitting a feedback report associated with each encoding scheme, or a number of feedback bits for a corresponding feedback report associated with each encoding scheme, or any combination thereof.

In some examples, the control signaling is a MAC-CE message or an RRC message.

Figure 8:
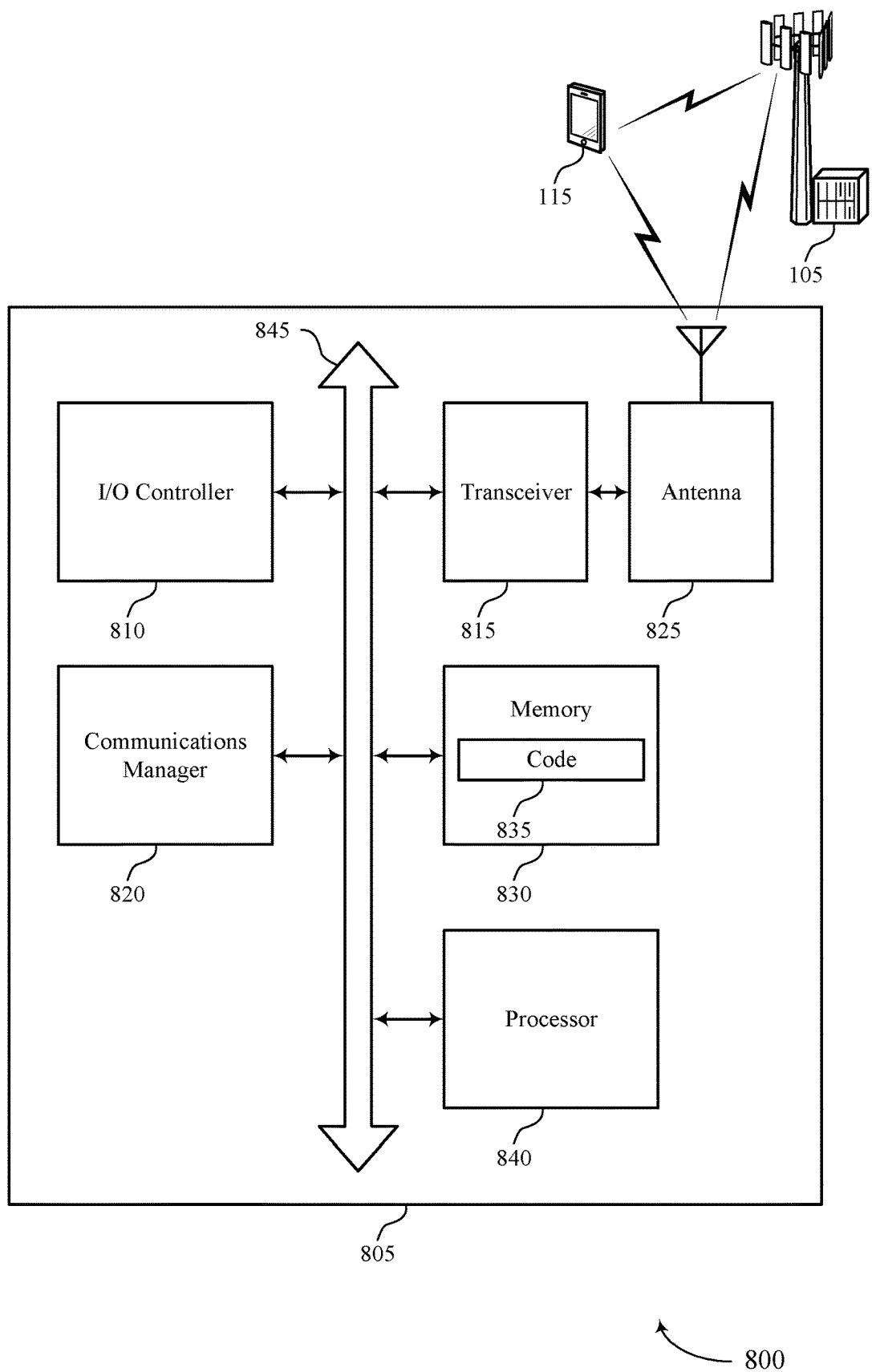
FIG. 8 shows a diagram of a system including a device that supports feedback for TBs with multiple MCSs in accordance with aspects of the present disclosure.

FIG. 8 shows a diagram of a system 800 including a device 805 that supports feedback for TBs with multiple MCSs in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting feedback for TBs with multiple MCSs). For example, the device 805 or a component of the device 805 may include a processor 840 and memory 830 coupled to the processor 840, the processor 840 and memory 830 configured to perform various functions described herein.

For example, the communications manager 820 may be configured as or otherwise support a means for receiving, from a base station via control signaling, a feedback configuration for reporting feedback for TBs encoded with at least two encoding schemes. The communications manager 820 may be configured as or otherwise support a means for receiving a TB including a set of multiple CBGs, where a first subset of CBGs of the set of multiple CBGs are encoded using a first encoding scheme and a second subset of CBGs of the set of multiple CBGs are encoded using a second encoding scheme different from the first encoding scheme. The communications manager 820 may be configured as or otherwise support a means for transmitting, according to the feedback configuration, a first feedback report for the first subset of CBGs corresponding to the first encoding scheme and a second feedback report for the second subset of CBGs corresponding to the second encoding scheme based on determining whether each of the set of multiple CBGs of the received TB are decoded by the UE.

By including or configuring the communications manager 820 in accordance with examples as described herein, the device 805 may support techniques for reduced latency, and more efficient utilization of communication resources, higher data rates, among other examples.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of feedback for TBs with multiple MCSs as described herein, or the processor 840 and the memory 830 may be otherwise configured to perform or support such operations.

Figure 9:
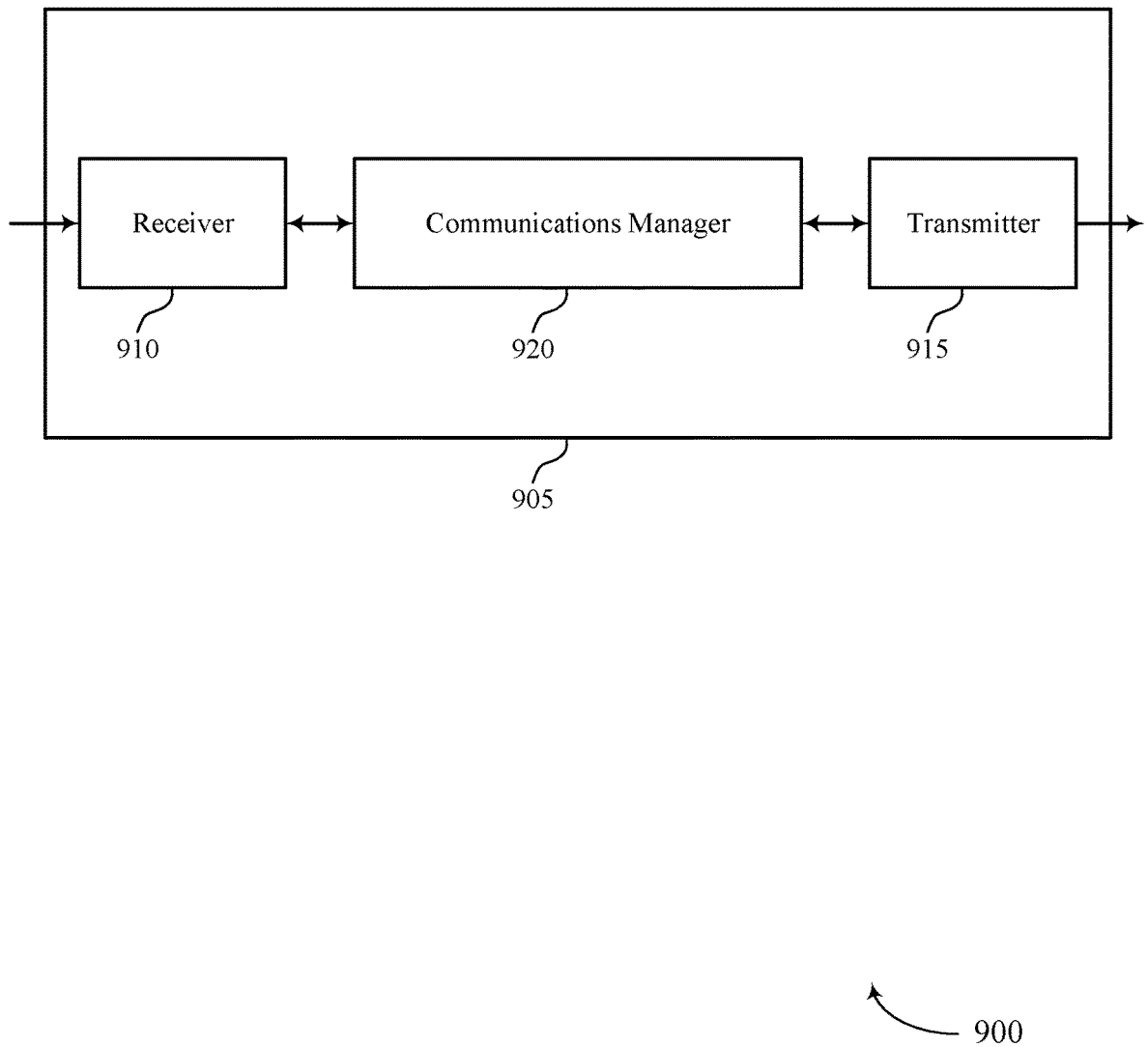
FIGS. 9 and 10 show block diagrams of devices that support feedback for TBs with multiple MCSs in accordance with aspects of the present disclosure.

FIG. 9 shows a block diagram 900 of a device 905 that supports feedback for TBs with multiple MCSs in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to feedback for TBs with multiple MCSs). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to feedback for TBs with multiple MCSs). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of feedback for TBs with multiple MCSs as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

For example, the communications manager 920 may be configured as or otherwise support a means for transmitting, to a UE via control signaling, a feedback configuration for reporting feedback for TBs encoded with at least two encoding schemes. The communications manager 920 may be configured as or otherwise support a means for transmitting a TB including a set of multiple CBGs, where a first subset of CBGs of the set of multiple CBGs are encoded using a first encoding scheme and a second subset of CBGs of the set of multiple CBGs are encoded using a second encoding scheme different from the first encoding scheme. The communications manager 920 may be configured as or otherwise support a means for receiving, from the UE, a first feedback report for the first subset of CBGs corresponding to the first encoding scheme and a second feedback report for the second subset of CBGs corresponding to the second encoding scheme where each feedback report indicates whether each of the set of multiple CBGs were decoded by the UE.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for more efficient utilization of communication resources, among other examples.

Figure 10:
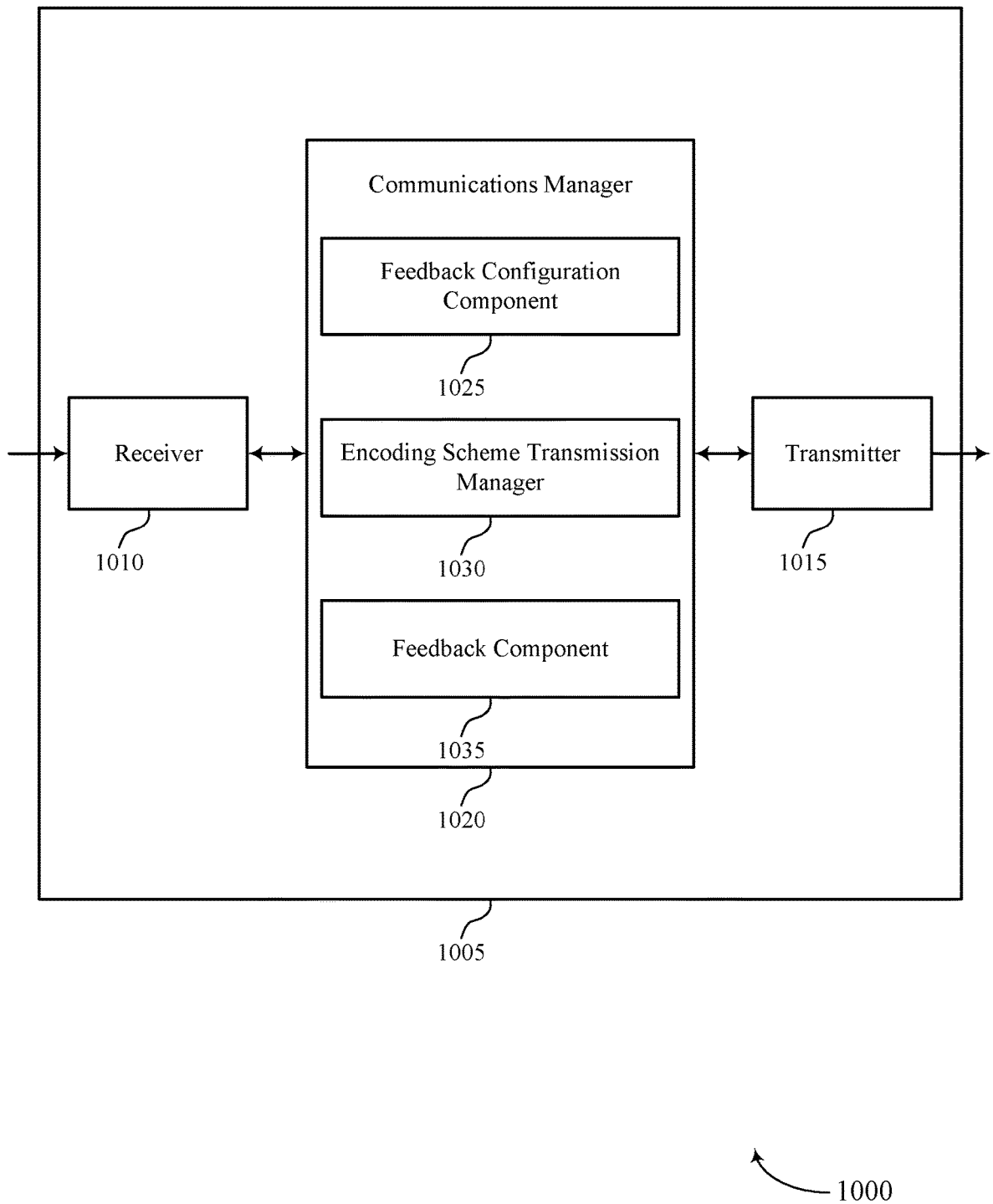

FIG. 10 shows a block diagram 1000 of a device 1005 that supports feedback for TBs with multiple MCSs in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to feedback for TBs with multiple MCSs). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to feedback for TBs with multiple MCSs). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of feedback for TBs with multiple MCSs as described herein. For example, the communications manager 1020 may include a feedback configuration component 1025, an encoding scheme transmission manager 1030, a feedback component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The feedback configuration component 1025 may be configured as or otherwise support a means for transmitting, to a UE via control signaling, a feedback configuration for reporting feedback for TBs encoded with at least two encoding schemes. The encoding scheme transmission manager 1030 may be configured as or otherwise support a means for transmitting a TB including a set of multiple CBGs, where a first subset of CBGs of the set of multiple CBGs are encoded using a first encoding scheme and a second subset of CBGs of the set of multiple CBGs are encoded using a second encoding scheme different from the first encoding scheme. The feedback component 1035 may be configured as or otherwise support a means for receiving, from the UE, a first feedback report for the first subset of CBGs corresponding to the first encoding scheme and a second feedback report for the second subset of CBGs corresponding to the second encoding scheme where each feedback report indicates whether each of the set of multiple CBGs were decoded by the UE.

Figure 11:
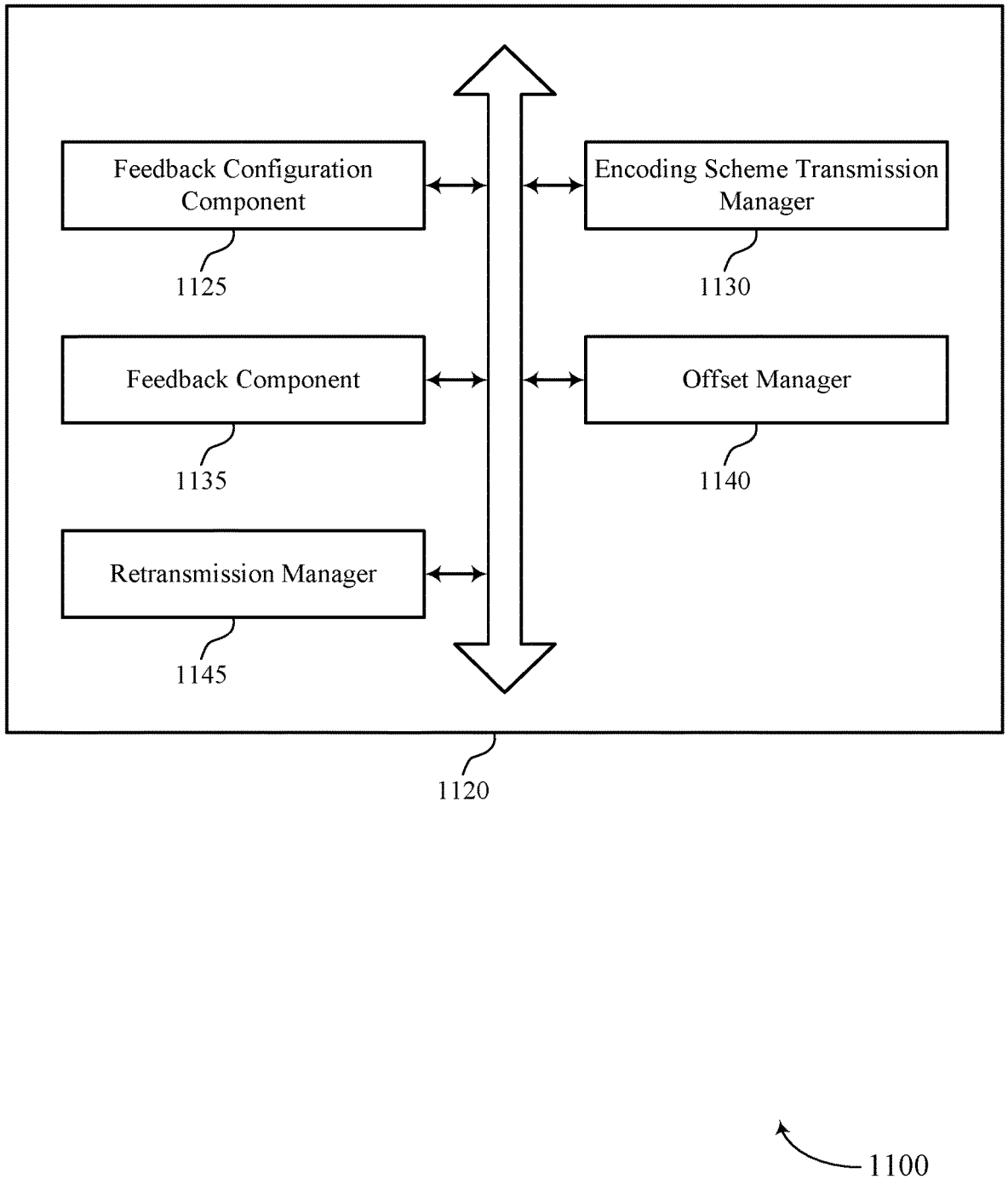
FIG. 11 shows a block diagram of a communications manager that supports feedback for TBs with multiple MCSs in accordance with aspects of the present disclosure.

FIG. 11 shows a block diagram 1100 of a communications manager 1120 that supports feedback for TBs with multiple MCSs in accordance with aspects of the present disclosure. The communications manager 1120 may be an example of aspects of a communications manager 920, a communications manager 1020, or both, as described herein. The communications manager 1120, or various components thereof, may be an example of means for performing various aspects of feedback for TBs with multiple MCSs as described herein. For example, the communications manager 1120 may include a feedback configuration component 1125, an encoding scheme transmission manager 1130, a feedback component 1135, an offset manager 1140, a retransmission manager 1145, or any combination thereof. Each of these components may communicate, directly or indirectly, with one another (e.g., via one or more buses).

The feedback configuration component 1125 may be configured as or otherwise support a means for transmitting, to a UE via control signaling, a feedback configuration for reporting feedback for TBs encoded with at least two encoding schemes. The encoding scheme transmission manager 1130 may be configured as or otherwise support a means for transmitting a TB including a set of multiple CBGs, where a first subset of CBGs of the set of multiple CBGs are encoded using a first encoding scheme and a second subset of CBGs of the set of multiple CBGs are encoded using a second encoding scheme different from the first encoding scheme. The feedback component 1135 may be configured as or otherwise support a means for receiving, from the UE, a first feedback report for the first subset of CBGs corresponding to the first encoding scheme and a second feedback report for the second subset of CBGs corresponding to the second encoding scheme where each feedback report indicates whether each of the set of multiple CBGs were decoded by the UE.

In some examples, the first feedback report is received on a first set of resources and the second feedback report is received on a second set of resources.

In some examples, the feedback component 1135 may be configured as or otherwise support a means for determining that the first feedback report is associated with the first subset of CBGs and that the second feedback report is associated with the second subset of CBGs based on receiving the first feedback report on the first set of resources and receiving the second feedback report on the second set of resources.

In some examples, the retransmission manager 1145 may be configured as or otherwise support a means for retransmitting a CBG of the first subset of CBGs, each CBG of the first subset of CBGs, a CBG of the second subset of CBGs, or each CBG of the second subset of CBGs, or any combination thereof, based on determining that the first feedback report is associated with the first subset of CBGs and that the second feedback report is associated with the second subset of CBGs.

In some examples, the offset manager 1140 may be configured as or otherwise support a means for transmitting an offset value indicating a set of time resources for communicating the first feedback report.

In some examples, the feedback component 1135 may be configured as or otherwise support a means for receiving the first feedback report over a first set of frequency resources during the set of time resources indicated by the offset value. In some examples, the feedback component 1135 may be configured as or otherwise support a means for receiving the second feedback report over a second set of frequency resources during the set of time resources indicated by the offset value.

In some examples, to support receiving the first feedback report and the second feedback report, the feedback component 1135 may be configured as or otherwise support a means for receiving the first feedback report during the set of time resources indicated by the offset value. In some examples, to support receiving the first feedback report and the second feedback report, the feedback component 1135 may be configured as or otherwise support a means for receiving the second feedback report during an available set of time resources occurring after the set of time resources.

In some examples, the offset manager 1140 may be configured as or otherwise support a means for transmitting a set of multiple offset values, where a first offset value of the set of multiple offset values indicates a first number of time resources between transmitting the TB and communicating the first feedback report and a second offset value of the set of multiple offset values indicates a second number of time resources between transmitting the TB and communicating the second feedback report.

In some examples, to support receiving the first feedback report and the second feedback report, the feedback component 1135 may be configured as or otherwise support a means for receiving the first feedback report over a first set of time resources indicated by the first offset value. In some examples, to support receiving the first feedback report and the second feedback report, the feedback component 1135 may be configured as or otherwise support a means for receiving the second feedback report over a second set of time resources indicated by the second offset value.

In some examples, the first feedback report is a first type of feedback report and the second feedback report is a second type of feedback report.

In some examples, at least one of the first type of feedback report or the second type of feedback report is a turbo-hybrid automatic request report.

In some examples, the first feedback report includes a feedback indication for the first subset of CBGs and the second feedback report includes a second feedback indication for the second subset of CBGs.

In some examples, the first feedback report includes a feedback indication for the first subset of CBGs and the second feedback report includes a corresponding feedback indication for each CBG of the second subset of CBGs.

In some examples, the first encoding scheme is associated with a low value and the second encoding scheme is associated with a high value.

In some examples, the feedback configuration indicates a feedback report type associated with each encoding scheme, a corresponding set of resources for communicating the feedback report associated with each encoding scheme, or a number of feedback bits for a corresponding feedback report associated with each encoding scheme, or any combination thereof.

In some examples, the control signaling is a MAC-CE message or an RRC message.

Figure 12:
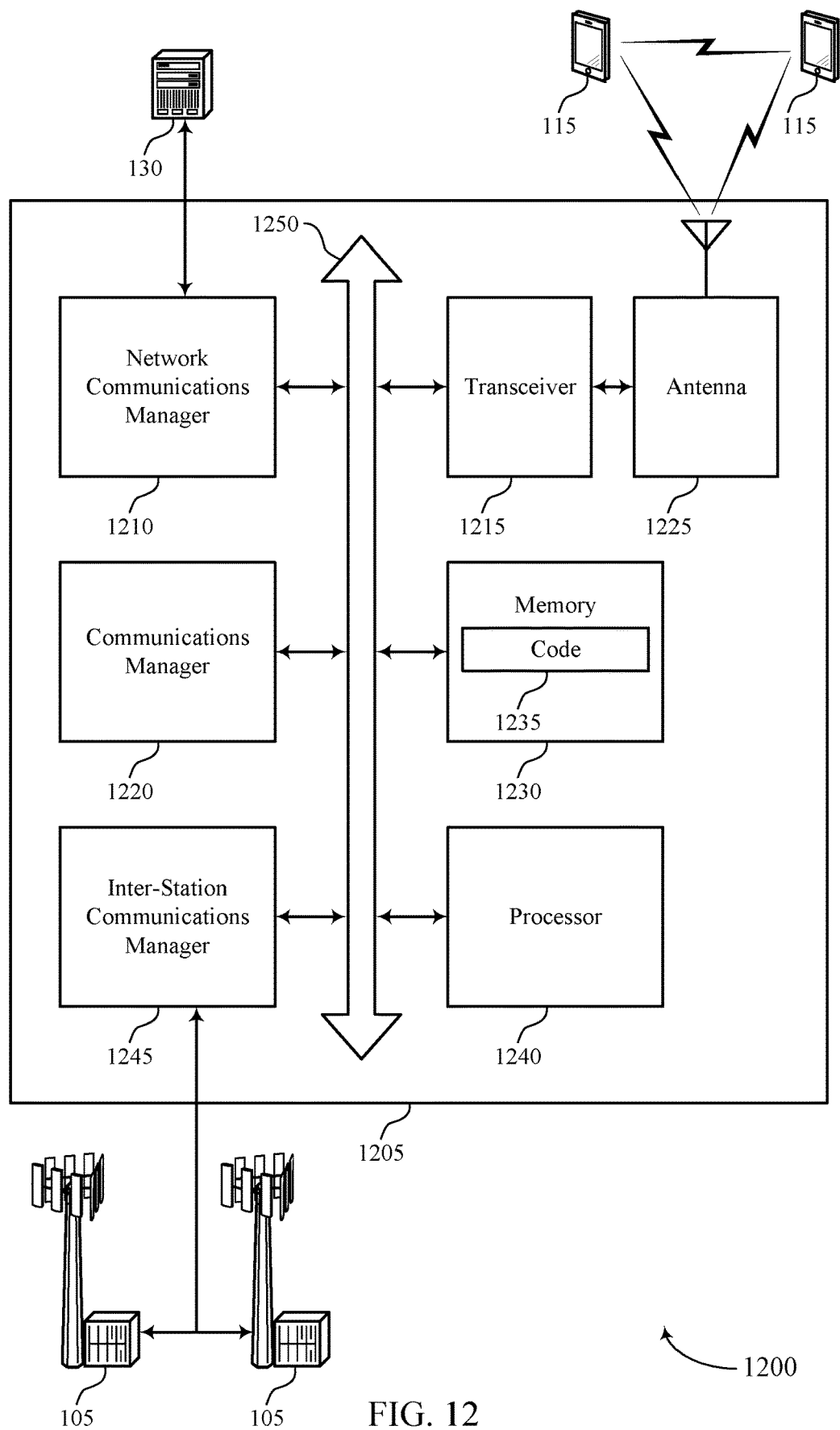
FIG. 12 shows a diagram of a system including a device that supports feedback for TBs with multiple MCSs in accordance with aspects of the present disclosure.

FIG. 12 shows a diagram of a system 1200 including a device 1205 that supports feedback for TBs with multiple MCSs in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting feedback for TBs with multiple MCSs). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

For example, the communications manager 1220 may be configured as or otherwise support a means for transmitting, to a UE via control signaling, a feedback configuration for reporting feedback for TBs encoded with at least two encoding schemes. The communications manager 1220 may be configured as or otherwise support a means for transmitting a TB including a set of multiple CBGs, where a first subset of CBGs of the set of multiple CBGs are encoded using a first encoding scheme and a second subset of CBGs of the set of multiple CBGs are encoded using a second encoding scheme different from the first encoding scheme. The communications manager 1220 may be configured as or otherwise support a means for receiving, from the UE, a first feedback report for the first subset of CBGs corresponding to the first encoding scheme and a second feedback report for the second subset of CBGs corresponding to the second encoding scheme where each feedback report indicates whether each of the set of multiple CBGs were decoded by the UE.

By including or configuring the communications manager 1220 in accordance with examples as described herein, the device 1205 may support techniques for reduced latency, and more efficient utilization of communication resources, higher data rates, among other examples.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of feedback for TBs with multiple MCSs as described herein, or the processor 1240 and the memory 1230 may be otherwise configured to perform or support such operations.

Figure 13:
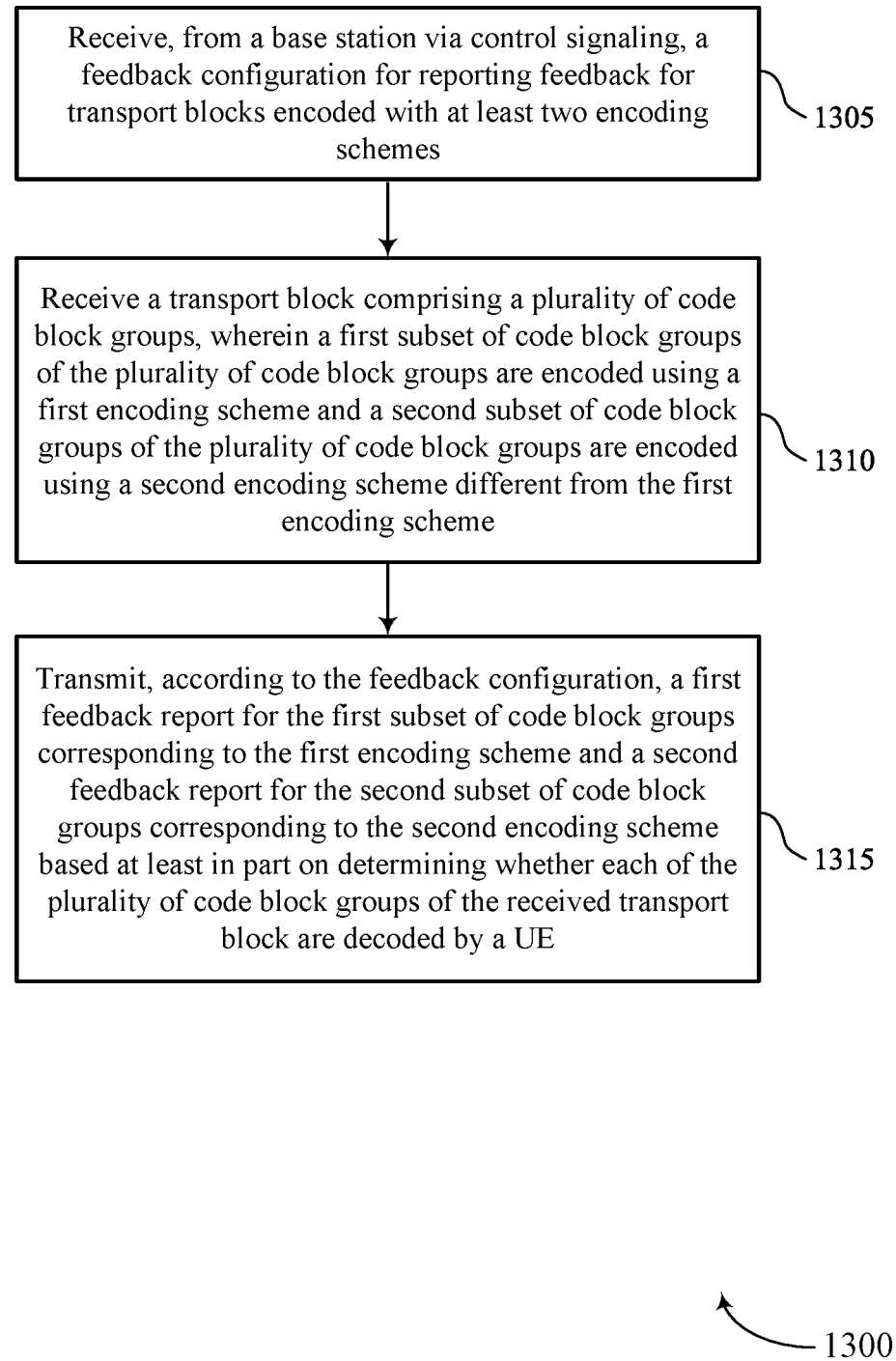
FIGS. 13 through 18 show flowcharts illustrating methods that support feedback for TBs with multiple MCSs in accordance with aspects of the present disclosure.

FIG. 13 shows a flowchart illustrating a method 1300 that supports feedback for TBs with multiple MCSs in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station via control signaling, a feedback configuration for reporting feedback for TBs encoded with at least two encoding schemes. The operations of 1305 may be performed in accordance with examples as disclosed herein. In some examples, aspects of the operations of 1305 may be performed by a feedback configuration manager 725 as described with reference to FIG. 7.

At 1310, the method may include receiving a TB including a set of multiple CBGs, where a first subset of CBGs of the set of multiple CBGs are encoded using a first encoding scheme and a second subset of CBGs of the set of multiple CBGs are encoded using a second encoding scheme different from the first encoding scheme. The operations of 1310 may be performed in accordance with examples as disclosed herein. In some examples, aspects of the operations of 1310 may be performed by an encoding scheme manager 730 as described with reference to FIG. 7.

At 1315, the method may include transmitting, according to the feedback configuration, a first feedback report for the first subset of CBGs corresponding to the first encoding scheme and a second feedback report for the second subset of CBGs corresponding to the second encoding scheme based on determining whether each of the set of multiple CBGs of the received TB are decoded by the UE. The operations of 1315 may be performed in accordance with examples as disclosed herein. In some examples, aspects of the operations of 1315 may be performed by a feedback manager 735 as described with reference to FIG. 7.

Figure 14:
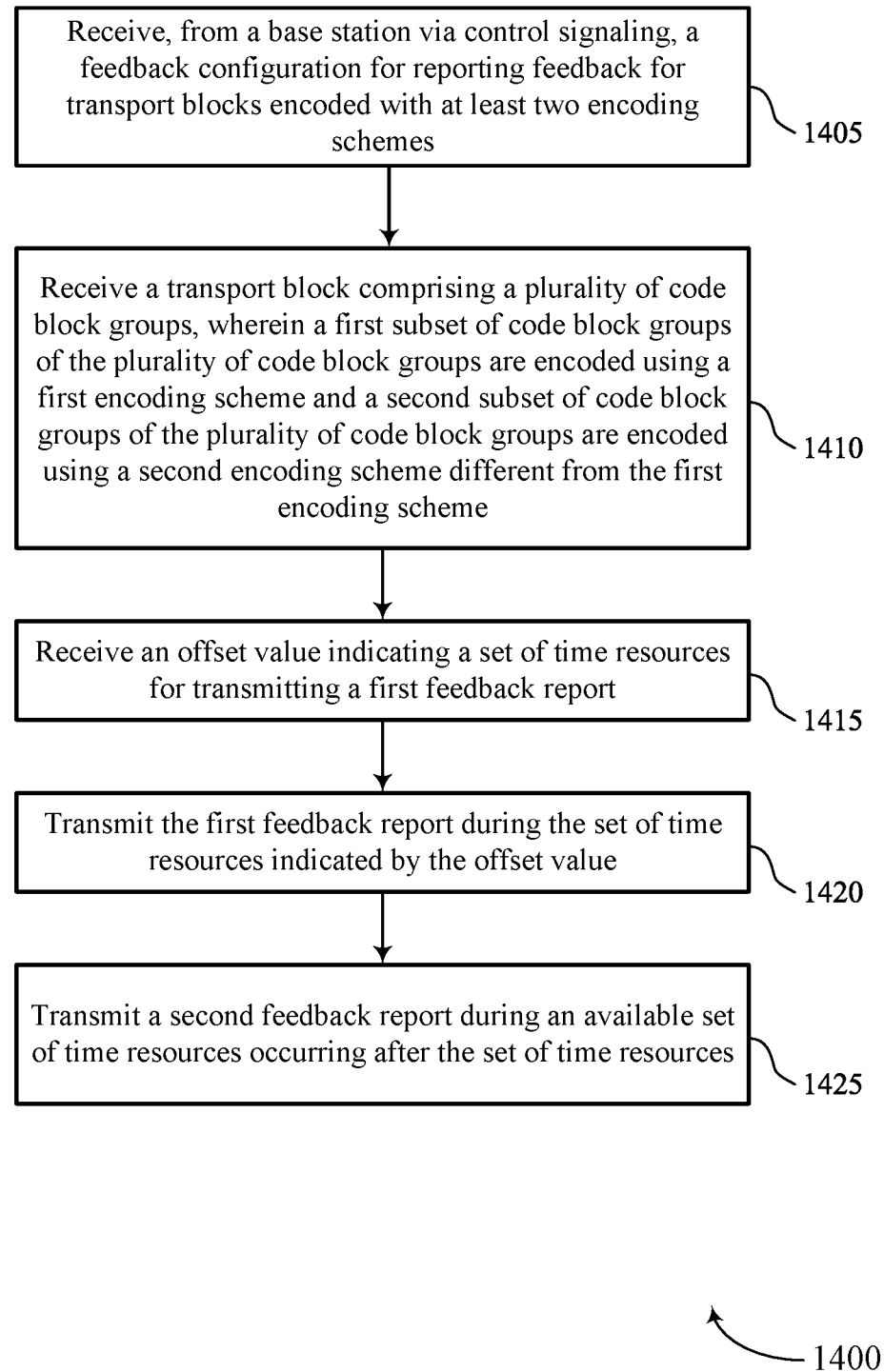

FIG. 14 shows a flowchart illustrating a method 1400 that supports feedback for TBs with multiple MCSs in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station via control signaling, a feedback configuration for reporting feedback for TBs encoded with at least two encoding schemes. The operations of 1405 may be performed in accordance with examples as disclosed herein. In some examples, aspects of the operations of 1405 may be performed by a feedback configuration manager 725 as described with reference to FIG. 7.

At 1410, the method may include receiving a TB including a set of multiple CBGs, where a first subset of CBGs of the set of multiple CBGs are encoded using a first encoding scheme and a second subset of CBGs of the set of multiple CBGs are encoded using a second encoding scheme different from the first encoding scheme. The operations of 1410 may be performed in accordance with examples as disclosed herein. In some examples, aspects of the operations of 1410 may be performed by an encoding scheme manager 730 as described with reference to FIG. 7.

At 1415, the method may include receiving an offset value indicating a set of time resources for transmitting a first feedback report. The operations of 1415 may be performed in accordance with examples as disclosed herein. In some examples, aspects of the operations of 1415 may be performed by an offset component 740 as described with reference to FIG. 7.

At 1420, the method may include transmitting the first feedback report during the set of time resources indicated by the offset value. The operations of 1420 may be performed in accordance with examples as disclosed herein. In some examples, aspects of the operations of 1420 may be performed by a feedback manager 735 as described with reference to FIG. 7.

At 1425, the method may include transmitting a second feedback report during an available set of time resources occurring after the set of time resources. The operations of 1425 may be performed in accordance with examples as disclosed herein. In some examples, aspects of the operations of 1425 may be performed by a feedback manager 735 as described with reference to FIG. 7.

Figure 15:
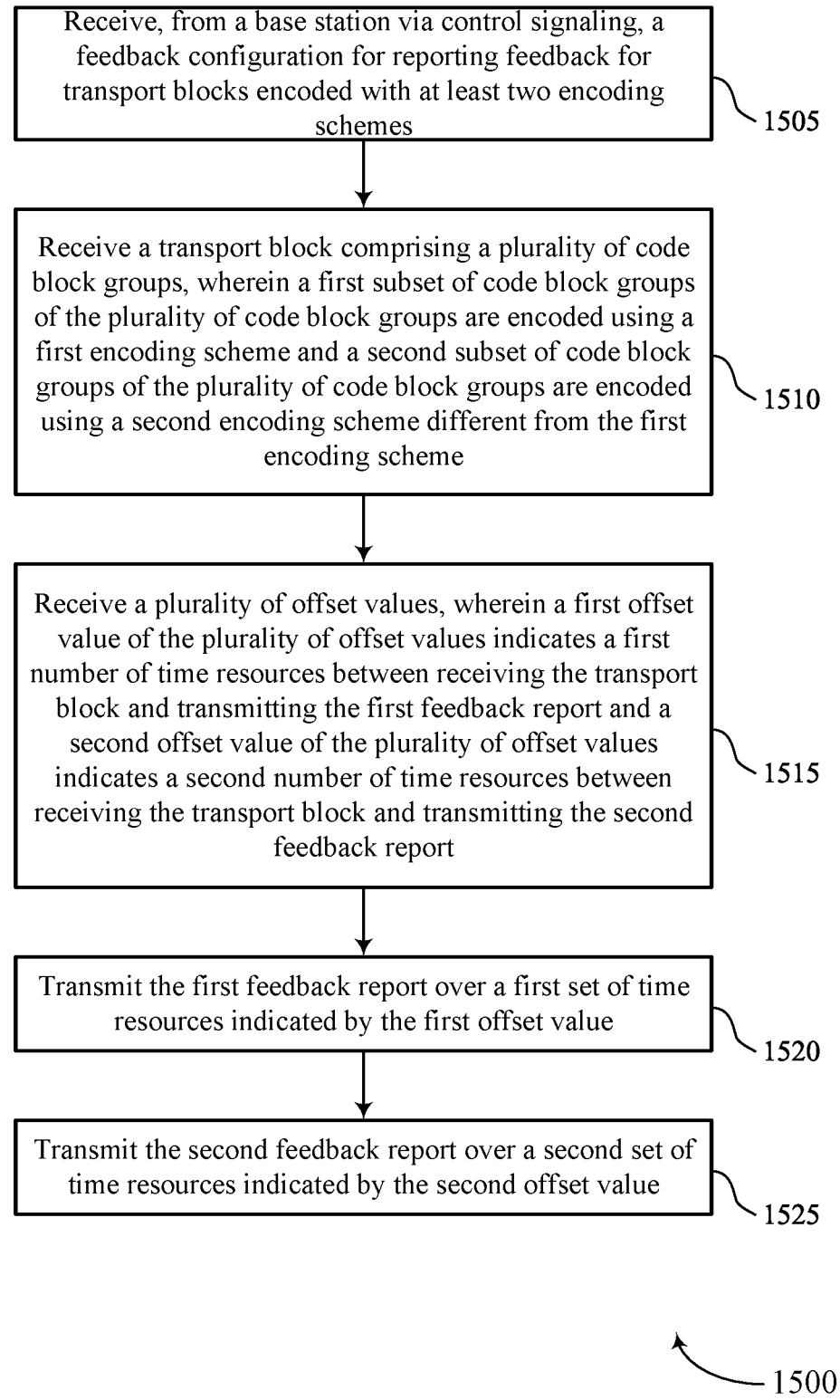

FIG. 15 shows a flowchart illustrating a method 1500 that supports feedback for TBs with multiple MCSs in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving, from a base station via control signaling, a feedback configuration for reporting feedback for TBs encoded with at least two encoding schemes. The operations of 1505 may be performed in accordance with examples as disclosed herein. In some examples, aspects of the operations of 1505 may be performed by a feedback configuration manager 725 as described with reference to FIG. 7.

At 1510, the method may include receiving a TB including a set of multiple CBGs, where a first subset of CBGs of the set of multiple CBGs are encoded using a first encoding scheme and a second subset of CBGs of the set of multiple CBGs are encoded using a second encoding scheme different from the first encoding scheme. The operations of 1510 may be performed in accordance with examples as disclosed herein. In some examples, aspects of the operations of 1510 may be performed by an encoding scheme manager 730 as described with reference to FIG. 7.

At 1515, the method may include receiving a set of multiple offset values, where a first offset value of the set of multiple offset values indicates a first number of time resources between receiving the TB and transmitting the first feedback report and a second offset value of the set of multiple offset values indicates a second number of time resources between receiving the TB and transmitting the second feedback report. The operations of 1515 may be performed in accordance with examples as disclosed herein. In some examples, aspects of the operations of 1515 may be performed by an offset component 740 as described with reference to FIG. 7.

At 1520, the method may include transmitting the first feedback report over a first set of time resources indicated by the first offset value. The operations of 1520 may be performed in accordance with examples as disclosed herein. In some examples, aspects of the operations of 1520 may be performed by a feedback manager 735 as described with reference to FIG. 7.

At 1525, the method may include transmitting the second feedback report over a second set of time resources indicated by the second offset value. The operations of 1525 may be performed in accordance with examples as disclosed herein. In some examples, aspects of the operations of 1525 may be performed by a feedback manager 735 as described with reference to FIG. 7.

Figure 16:
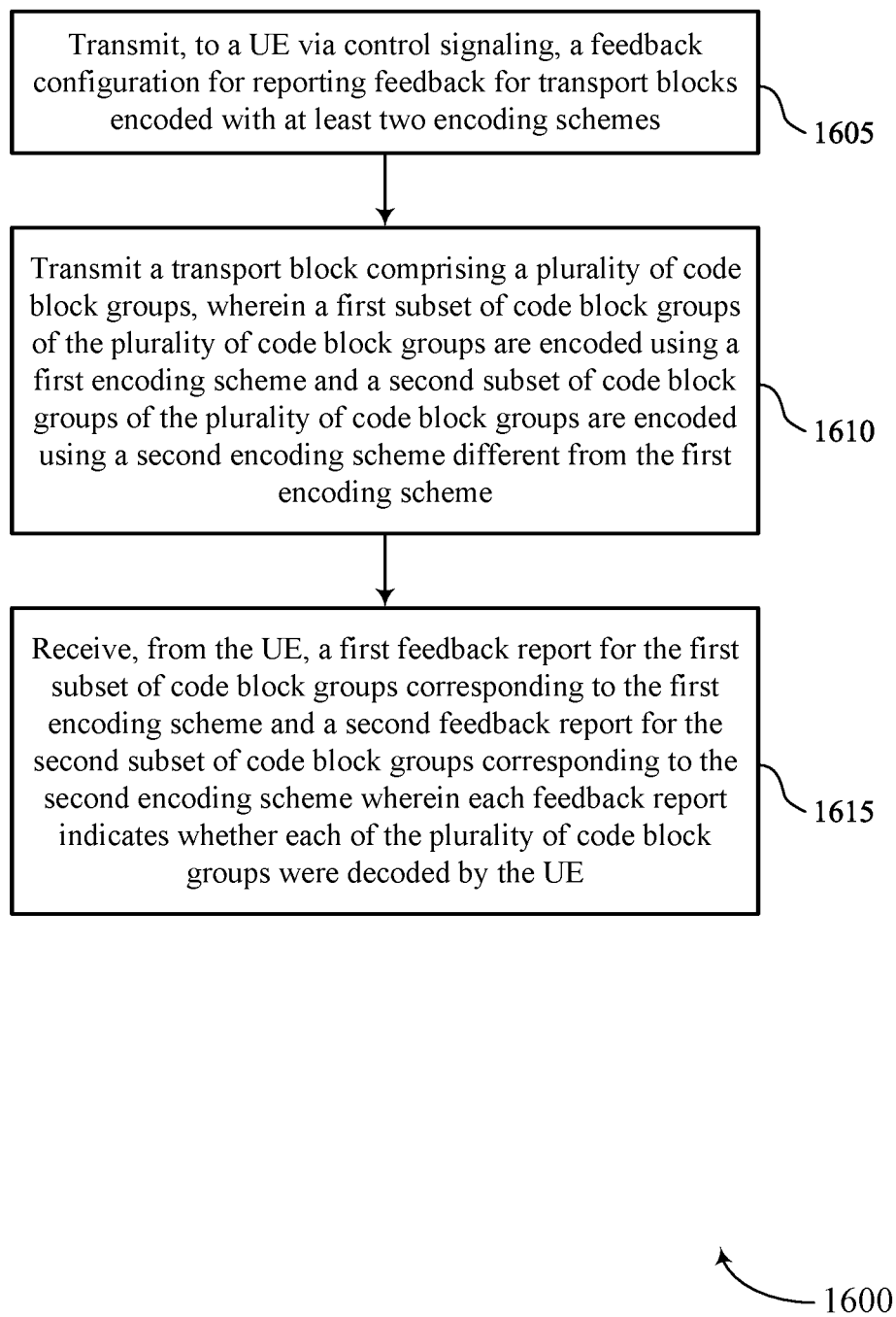

FIG. 16 shows a flowchart illustrating a method 1600 that supports feedback for TBs with multiple MCSs in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE via control signaling, a feedback configuration for reporting feedback for TBs encoded with at least two encoding schemes. The operations of 1605 may be performed in accordance with examples as disclosed herein. In some examples, aspects of the operations of 1605 may be performed by a feedback configuration component 1125 as described with reference to FIG. 11.

At 1610, the method may include transmitting a TB including a set of multiple CBGs, where a first subset of CBGs of the set of multiple CBGs are encoded using a first encoding scheme and a second subset of CBGs of the set of multiple CBGs are encoded using a second encoding scheme different from the first encoding scheme. The operations of 1610 may be performed in accordance with examples as disclosed herein. In some examples, aspects of the operations of 1610 may be performed by an encoding scheme transmission manager 1130 as described with reference to FIG. 11.

At 1615, the method may include receiving, from the UE, a first feedback report for the first subset of CBGs corresponding to the first encoding scheme and a second feedback report for the second subset of CBGs corresponding to the second encoding scheme where each feedback report indicates whether each of the set of multiple CBGs were decoded by the UE. The operations of 1615 may be performed in accordance with examples as disclosed herein. In some examples, aspects of the operations of 1615 may be performed by a feedback component 1135 as described with reference to FIG. 11.

Figure 17:
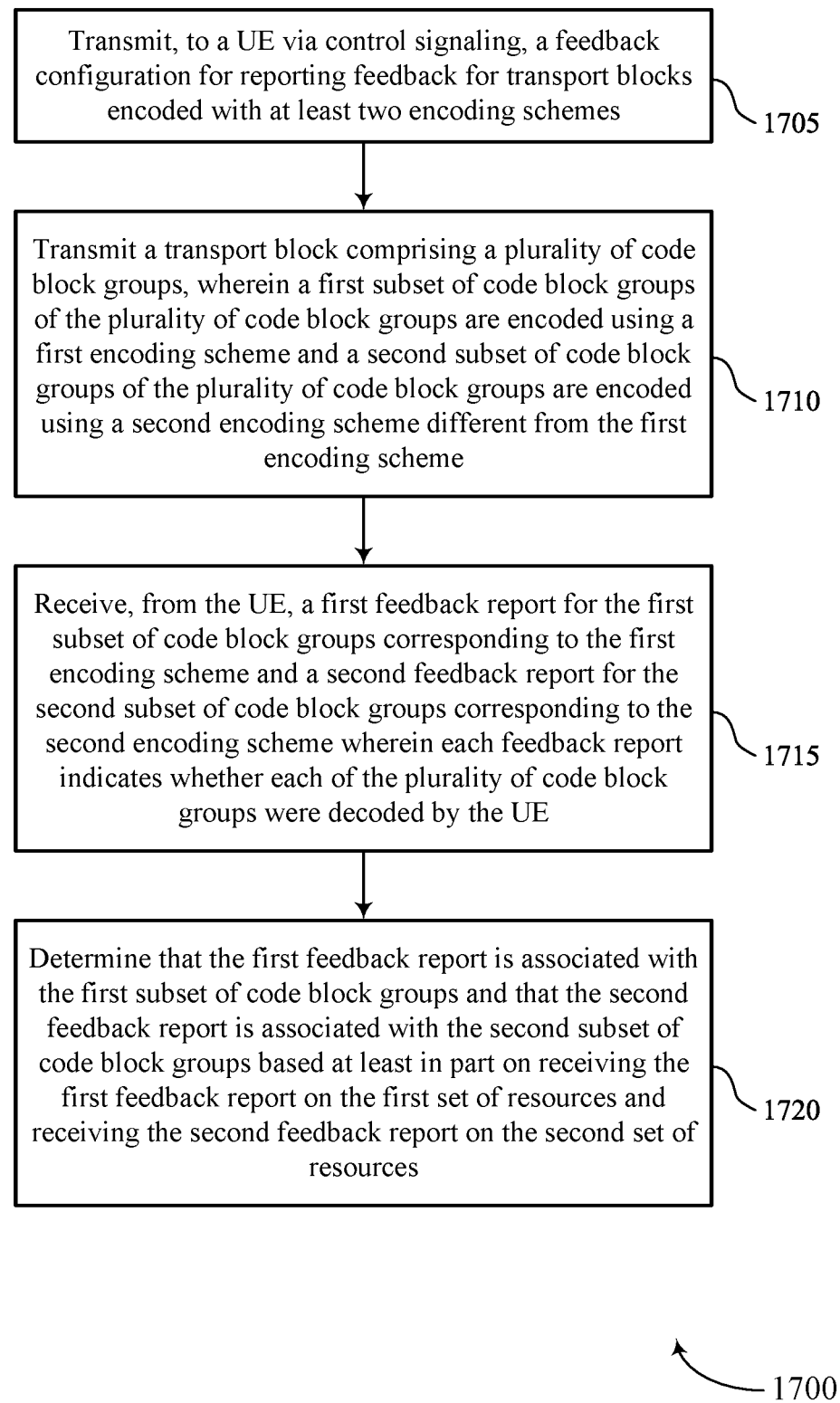

FIG. 17 shows a flowchart illustrating a method 1700 that supports feedback for TBs with multiple MCSs in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE via control signaling, a feedback configuration for reporting feedback for TBs encoded with at least two encoding schemes. The operations of 1705 may be performed in accordance with examples as disclosed herein. In some examples, aspects of the operations of 1705 may be performed by a feedback configuration component 1125 as described with reference to FIG. 11.

At 1710, the method may include transmitting a TB including a set of multiple CBGs, where a first subset of CBGs of the set of multiple CBGs are encoded using a first encoding scheme and a second subset of CBGs of the set of multiple CBGs are encoded using a second encoding scheme different from the first encoding scheme. The operations of 1710 may be performed in accordance with examples as disclosed herein. In some examples, aspects of the operations of 1710 may be performed by an encoding scheme transmission manager 1130 as described with reference to FIG. 11.

At 1715, the method may include receiving, from the UE, a first feedback report for the first subset of CBGs corresponding to the first encoding scheme and a second feedback report for the second subset of CBGs corresponding to the second encoding scheme where each feedback report indicates whether each of the set of multiple CBGs were decoded by the UE. The operations of 1715 may be performed in accordance with examples as disclosed herein. In some examples, aspects of the operations of 1715 may be performed by a feedback component 1135 as described with reference to FIG. 11.

At 1720, the method may include determining that the first feedback report is associated with the first subset of CBGs and that the second feedback report is associated with the second subset of CBGs based on receiving the first feedback report on the first set of resources and receiving the second feedback report on the second set of resources. The operations of 1720 may be performed in accordance with examples as disclosed herein. In some examples, aspects of the operations of 1720 may be performed by a feedback component 1135 as described with reference to FIG. 11.

Figure 18:
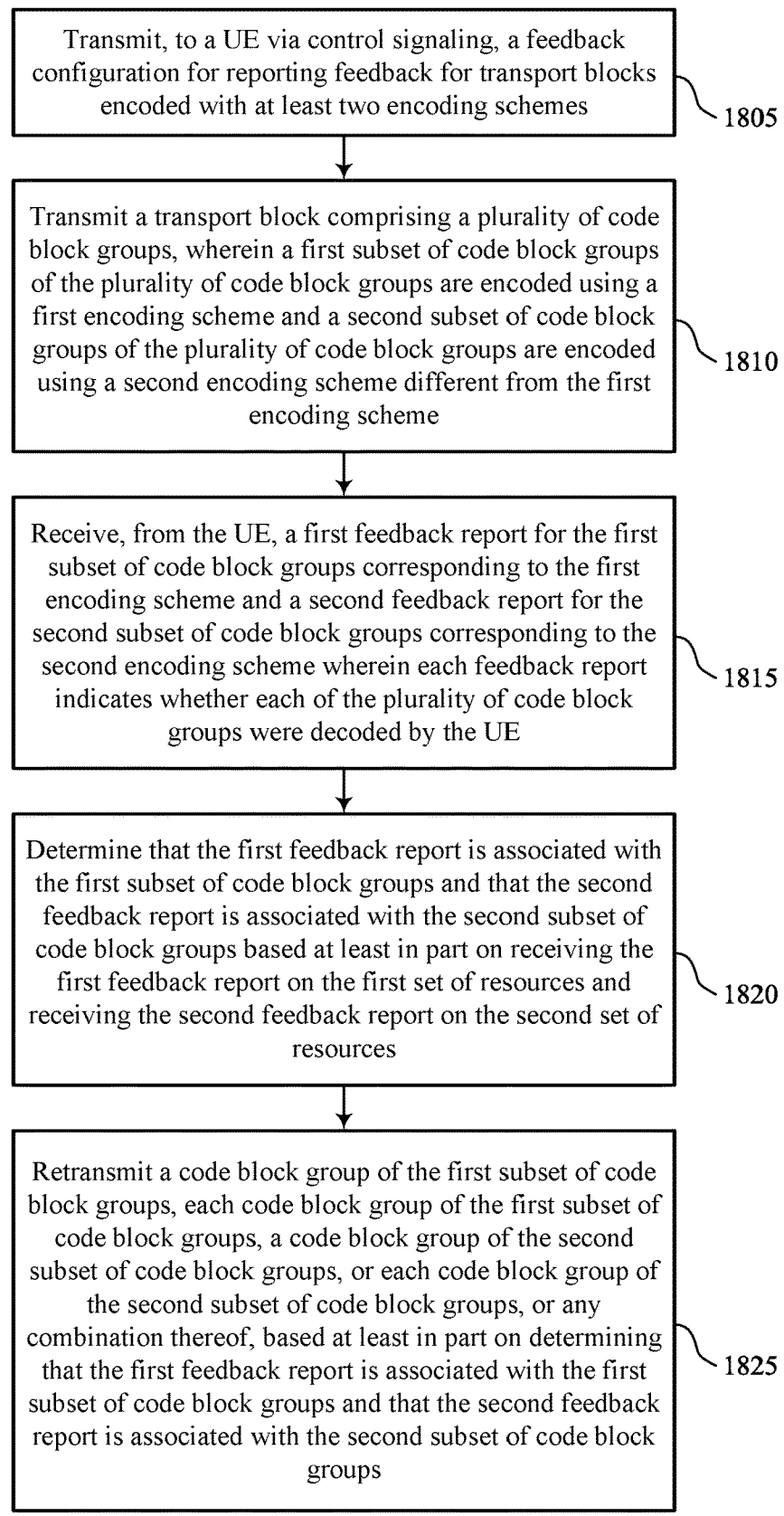

FIG. 18 shows a flowchart illustrating a method 1800 that supports feedback for TBs with multiple MCSs in accordance with aspects of the present disclosure. The operations of the method 1800 may be implemented by a base station or its components as described herein. For example, the operations of the method 1800 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1805, the method may include transmitting, to a UE via control signaling, a feedback configuration for reporting feedback for TBs encoded with at least two encoding schemes. The operations of 1805 may be performed in accordance with examples as disclosed herein. In some examples, aspects of the operations of 1805 may be performed by a feedback configuration component 1125 as described with reference to FIG. 11.

At 1810, the method may include transmitting a TB including a set of multiple CBGs, where a first subset of CBGs of the set of multiple CBGs are encoded using a first encoding scheme and a second subset of CBGs of the set of multiple CBGs are encoded using a second encoding scheme different from the first encoding scheme. The operations of 1810 may be performed in accordance with examples as disclosed herein. In some examples, aspects of the operations of 1810 may be performed by an encoding scheme transmission manager 1130 as described with reference to FIG. 11.

At 1815, the method may include receiving, from the UE, a first feedback report for the first subset of CBGs corresponding to the first encoding scheme and a second feedback report for the second subset of CBGs corresponding to the second encoding scheme where each feedback report indicates whether each of the set of multiple CBGs were decoded by the UE. The operations of 1815 may be performed in accordance with examples as disclosed herein. In some examples, aspects of the operations of 1815 may be performed by a feedback component 1135 as described with reference to FIG. 11.

At 1820, the method may include determining that the first feedback report is associated with the first subset of CBGs and that the second feedback report is associated with the second subset of CBGs based on receiving the first feedback report on the first set of resources and receiving the second feedback report on the second set of resources. The operations of 1820 may be performed in accordance with examples as disclosed herein. In some examples, aspects of the operations of 1820 may be performed by a feedback component 1135 as described with reference to FIG. 11.

At 1825, the method may include retransmitting a CBG of the first subset of CBGs, each CBG of the first subset of CBGs, a CBG of the second subset of CBGs, or each CBG of the second subset of CBGs, or any combination thereof, based on determining that the first feedback report is associated with the first subset of CBGs and that the second feedback report is associated with the second subset of CBGs. The operations of 1825 may be performed in accordance with examples as disclosed herein. In some examples, aspects of the operations of 1825 may be performed by a retransmission manager 1145 as described with reference to FIG. 11.

The following provides an overview of aspects of the present disclosure:

Aspect 1: A method of wireless communication at a UE, comprising: receiving, from a base station via control signaling, a feedback configuration for reporting feedback for TBs encoded with at least two encoding schemes; receiving a TB comprising a plurality of CBGs, wherein a first subset of CBGs of the plurality of CBGs are encoded using a first encoding scheme and a second subset of CBGs of the plurality of CBGs are encoded using a second encoding scheme different from the first encoding scheme; and transmitting, according to the feedback configuration, a first feedback report for the first subset of CBGs corresponding to the first encoding scheme and a second feedback report for the second subset of CBGs corresponding to the second encoding scheme based at least in part on determining whether each of the plurality of CBGs of the received TB are decoded by the UE.

Aspect 2: The method of aspect 1, wherein the first feedback report is transmitted on a first set of resources and the second feedback report is transmitted on a second set of resources.

Aspect 3: The method of aspect 2, further comprising: receiving an offset value indicating a set of time resources for transmitting the first feedback report.

Aspect 4: The method of aspect 3, wherein the first set of resources and the second set of resources are frequency division multiplexed, the transmitting the first feedback report and the second feedback report further comprising: transmitting the first feedback report over a first set of frequency resources during the set of time resources indicated by the offset value; and transmitting the second feedback report over a second set of frequency resources during the set of time resources indicated by the offset value.

Aspect 5: The method of any of aspects 3 through 4, wherein transmitting the first feedback report and the second feedback report further comprises: transmitting the first feedback report during the set of time resources indicated by the offset value; and transmitting the second feedback report during an available set of time resources occurring after the set of time resources.

Aspect 6: The method of any of aspects 1 through 5, further comprising: receiving a plurality of offset values, wherein a first offset value of the plurality of offset values indicates a first number of time resources between receiving the TB and transmitting the first feedback report and a second offset value of the plurality of offset values indicates a second number of time resources between receiving the TB and transmitting the second feedback report.

Aspect 7: The method of aspect 6, wherein transmitting the first feedback report and the second feedback report further comprises: transmitting the first feedback report over a first set of time resources indicated by the first offset value; and transmitting the second feedback report over a second set of time resources indicated by the second offset value.

Aspect 8: The method of any of aspects 1 through 7, wherein the first feedback report is a first type of feedback report and the second feedback report is a second type of feedback report.

Aspect 9: The method of aspect 8, wherein at least one of the first type of feedback report or the second type of feedback report is a turbo-HARQ report.

Aspect 10: The method of any of aspects 1 through 9, wherein the first feedback report comprises a feedback indication for the first subset of CBGs and the second feedback report comprises a second feedback indication for the second subset of CBGs.

Aspect 11: The method of any of aspects 1 through 10, wherein the first feedback report comprises a feedback indication for the first subset of CBGs and the second feedback report comprises a corresponding feedback indication for each CBG of the second subset of CBGs.

Aspect 12: The method of aspect 11, wherein the first encoding scheme is associated with a low value and the second encoding scheme is associated with a high value.

Aspect 13: The method of any of aspects 1 through 12, wherein the feedback configuration indicates a feedback report type associated with each encoding scheme, a corresponding set of resources for transmitting a feedback report associated with each encoding scheme, or a number of feedback bits for a corresponding feedback report associated with each encoding scheme, or any combination thereof.

Aspect 14: The method of any of aspects 1 through 13, wherein the control signaling is a MAC-CE or an RRC message.

Aspect 15: A method of wireless communication at a base station, comprising: transmitting, to a UE via control signaling, a feedback configuration for reporting feedback for TBs encoded with at least two encoding schemes; transmitting a TB comprising a plurality of CBGs, wherein a first subset of CBGs of the plurality of CBGs are encoded using a first encoding scheme and a second subset of CBGs of the plurality of CBGs are encoded using a second encoding scheme different from the first encoding scheme; and receiving, from the UE, a first feedback report for the first subset of CBGs corresponding to the first encoding scheme and a second feedback report for the second subset of CBGs corresponding to the second encoding scheme wherein each feedback report indicates whether each of the plurality of CBGs were decoded by the UE.

Aspect 16: The method of aspect 15, wherein the first feedback report is received on a first set of resources and the second feedback report is received on a second set of resources.

Aspect 17: The method of aspect 16, further comprising: determining that the first feedback report is associated with the first subset of CBGs and that the second feedback report is associated with the second subset of CBGs based at least in part on receiving the first feedback report on the first set of resources and receiving the second feedback report on the second set of resources.

Aspect 18: The method of aspect 17, further comprising: retransmitting a CBG of the first subset of CBGs, each CBG of the first subset of CBGs, a CBG of the second subset of CBGs, or each CBG of the second subset of CBGs, or any combination thereof, based at least in part on determining that the first feedback report is associated with the first subset of CBGs and that the second feedback report is associated with the second subset of CBGs.

Aspect 19: The method of any of aspects 16 through 18, further comprising: transmitting an offset value indicating a set of time resources for communicating the first feedback report.

Aspect 20: The method of aspect 19, wherein the first set of resources and the second set of resources are frequency division multiplexed, the receiving the first feedback report and the second feedback report further comprising: receiving the first feedback report over a first set of frequency resources during the set of time resources indicated by the offset value; and receiving the second feedback report over a second set of frequency resources during the set of time resources indicated by the offset value.

Aspect 21: The method of any of aspects 19 through 20, wherein receiving the first feedback report and the second feedback report further comprises: receiving the first feedback report during the set of time resources indicated by the offset value; and receiving the second feedback report during an available set of time resources occurring after the set of time resources.

Aspect 22: The method of any of aspects 15 through 21, further comprising: transmitting a plurality of offset values, wherein a first offset value of the plurality of offset values indicates a first number of time resources between transmitting the TB and communicating the first feedback report and a second offset value of the plurality of offset values indicates a second number of time resources between transmitting the TB and communicating the second feedback report.

Aspect 23: The method of aspect 22, wherein receiving the first feedback report and the second feedback report further comprises: receiving the first feedback report over a first set of time resources indicated by the first offset value; and receiving the second feedback report over a second set of time resources indicated by the second offset value.

Aspect 24: The method of any of aspects 15 through 23, wherein the first feedback report is a first type of feedback report and the second feedback report is a second type of feedback report.

Aspect 25: The method of aspect 24, wherein at least one of the first type of feedback report or the second type of feedback report is a turbo-HARQ report.

Aspect 26: The method of any of aspects 15 through 25, wherein the first feedback report comprises a feedback indication for the first subset of CBGs and the second feedback report comprises a second feedback indication for the second subset of CBGs.

Aspect 27: The method of any of aspects 15 through 26, wherein the first feedback report comprises a feedback indication for the first subset of CBGs and the second feedback report comprises a corresponding feedback indication for each CBG of the second subset of CBGs.

Aspect 28: The method of aspect 27, wherein the first encoding scheme is associated with a low value and the second encoding scheme is associated with a high value.

Aspect 29: The method of any of aspects 15 through 28, wherein the feedback configuration indicates a feedback report type associated with each encoding scheme, a corresponding set of resources for communicating the feedback report associated with each encoding scheme, or a number of feedback bits for a corresponding feedback report associated with each encoding scheme, or any combination thereof.

Aspect 30: The method of any of aspects 15 through 29, wherein the control signaling is a MAC-CE message or an RRC message.

Aspect 31: An apparatus comprising a memory and a processor coupled with the memory and configured to perform a method of any of aspects 1 through 14.

Aspect 32: An apparatus comprising at least one means for performing a method of any of aspects 1 through 14.

Aspect 33: A non-transitory computer-readable medium storing code the code comprising instructions executable by a processor to perform a method of any of aspects 1 through 14.

Aspect 34: An apparatus comprising a memory and a processor coupled with the memory and configured to perform a method of any of aspects 15 through 30.

Aspect 35: An apparatus comprising at least one means for performing a method of any of aspects 15 through 30.

Aspect 36: A non-transitory computer-readable medium storing code the code comprising instructions executable by a processor to perform a method of any of aspects 15 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   a memory; and
   a processor coupled with the memory and configured to:
      receive, from a network entity via control signaling, a feedback configuration for reporting feedback for transport blocks encoded with at least two encoding schemes;
      receive a transport block comprising a plurality of code block groups, wherein a first subset of code block groups of the plurality of code block groups are encoded using a first encoding scheme and a second subset of code block groups of the plurality of code block groups are encoded using a second encoding scheme different from the first encoding scheme; and
      transmit, according to the feedback configuration, a first feedback report for the first subset of code block groups corresponding to the first encoding scheme and a second feedback report for the second subset of code block groups corresponding to the second encoding scheme based at least in part on determining whether each of the plurality of code block groups of the received transport block are decoded.

2. The apparatus of claim 1, wherein the first feedback report is transmitted on a first set of resources and the second feedback report is transmitted on a second set of resources.

3. The apparatus of claim 2, wherein the processor is further configured to:
   receive an offset value indicating a set of time resources for transmitting the first feedback report.

4. The apparatus of claim 3, wherein the processor is further configured to:
   transmit the first feedback report over a first set of frequency resources during the set of time resources indicated by the offset value; and
   transmit the second feedback report over a second set of frequency resources during the set of time resources indicated by the offset value.

5. The apparatus of claim 3, wherein the processor is further configured to:
   transmit the first feedback report during the set of time resources indicated by the offset value; and
   transmit the second feedback report during an available set of time resources occurring after the set of time resources.

6. The apparatus of claim 1, wherein processor is further configured to:
   receive a plurality of offset values, wherein a first offset value of the plurality of offset values indicates a first quantity of time resources between receiving the transport block and transmitting the first feedback report and a second offset value of the plurality of offset values indicates a second quantity of time resources between receiving the transport block and transmitting the second feedback report.

7. The apparatus of claim 6, wherein the processor is further configured to cause the apparatus to:
   transmit the first feedback report over a first set of time resources indicated by the first offset value; and
   transmit the second feedback report over a second set of time resources indicated by the second offset value.

8. The apparatus of claim 1, wherein the first feedback report is a first type of feedback report and the second feedback report is a second type of feedback report.

9. The apparatus of claim 8, wherein at least one of the first type of feedback report or the second type of feedback report is a turbo-hybrid automatic request report.

10. The apparatus of claim 1, wherein the first feedback report comprises a feedback indication for the first subset of code block groups and the second feedback report comprises a second feedback indication for the second subset of code block groups.

11. The apparatus of claim 1, wherein the first feedback report comprises a feedback indication for the first subset of code block groups and the second feedback report comprises a corresponding feedback indication for each code block group of the second subset of code block groups.

12. The apparatus of claim 11, wherein the first encoding scheme is associated with a low value and the second encoding scheme is associated with a high value.

13. The apparatus of claim 1, wherein the feedback configuration indicates a feedback report type associated with each encoding scheme, a corresponding set of resources for transmitting a feedback report associated with each encoding scheme, or a quantity of feedback bits for a corresponding feedback report associated with each encoding scheme, or any combination thereof.

14. The apparatus of claim 1, wherein the control signaling is a medium access control-control element message or a radio resource control message.

15. An apparatus, comprising:
a memory; and
a processor coupled with the memory and configured to:
transmit, to a user equipment (UE) via control signaling, a feedback configuration for reporting feedback for transport blocks encoded with at least two encoding schemes;
transmit a transport block comprising a plurality of code block groups, wherein a first subset of code block groups of the plurality of code block groups are encoded using a first encoding scheme and a second subset of code block groups of the plurality of code block groups are encoded using a second encoding scheme different from the first encoding scheme; and
receive, from the UE, a first feedback report for the first subset of code block groups corresponding to the first encoding scheme and a second feedback report for the second subset of code block groups corresponding to the second encoding scheme wherein each feedback report indicates whether each of the plurality of code block groups were decoded.

16. The apparatus of claim 15, wherein the first feedback report is received on a first set of resources and the second feedback report is received on a second set of resources.

17. The apparatus of claim 16, wherein the processor is further configured to:
determine that the first feedback report is associated with the first subset of code block groups and that the second feedback report is associated with the second subset of code block groups based at least in part on receiving the first feedback report on the first set of resources and receiving the second feedback report on the second set of resources.

18. The apparatus of claim 17, wherein the processor is further configured to:
retransmit a code block group of the first subset of code block groups, each code block group of the first subset of code block groups, a code block group of the second subset of code block groups, or each code block group of the second subset of code block groups, or any combination thereof, based at least in part on determining that the first feedback report is associated with the first subset of code block groups and that the second feedback report is associated with the second subset of code block groups.

19. The apparatus of claim 16, wherein the processor is further configured to:
transmit an offset value indicating a set of time resources for communicating the first feedback report.

20. The apparatus of claim 19, wherein the processor is further configured to:
receive the first feedback report over a first set of frequency resources during the set of time resources indicated by the offset value; and
receive the second feedback report over a second set of frequency resources during the set of time resources indicated by the offset value.

21. The apparatus of claim 19, wherein the processor is further configured to:
receive the first feedback report during the set of time resources indicated by the offset value; and
receive the second feedback report during an available set of time resources occurring after the set of time resources.

22. The apparatus of claim 15, wherein the processor is further configured to:
transmit a plurality of offset values, wherein a first offset value of the plurality of offset values indicates a first quantity of time resources between transmitting the transport block and communicating the first feedback report and a second offset value of the plurality of offset values indicates a second quantity of time resources between transmitting the transport block and communicating the second feedback report.

23. The apparatus of claim 22, wherein the processor is further configured to:
receive the first feedback report over a first set of time resources indicated by the first offset value; and
receive the second feedback report over a second set of time resources indicated by the second offset value.

24. The apparatus of claim 15, wherein the first feedback report is a first type of feedback report and the second feedback report is a second type of feedback report.

25. The apparatus of claim 24, wherein at least one of the first type of feedback report or the second type of feedback report is a turbo-hybrid automatic request report.

26. The apparatus of claim 15, wherein the first feedback report comprises a feedback indication for the first subset of code block groups and the second feedback report comprises a second feedback indication for the second subset of code block groups.

27. The apparatus of claim 15, wherein the first feedback report comprises a feedback indication for the first subset of code block groups and the second feedback report comprises a corresponding feedback indication for each code block group of the second subset of code block groups.

28. The apparatus of claim 15, wherein the feedback configuration indicates a feedback report type associated with each encoding scheme, a corresponding set of resources for communicating a feedback report associated with each encoding scheme, or a quantity of feedback bits for a corresponding feedback report associated with each encoding scheme, or any combination thereof.

29. A method of wireless communication at a user equipment (UE), comprising:

receiving, from a network entity via control signaling, a feedback configuration for reporting feedback for transport blocks encoded with at least two encoding schemes;

receiving a transport block comprising a plurality of code block groups, wherein a first subset of code block groups of the plurality of code block groups are encoded using a first encoding scheme and a second subset of code block groups of the plurality of code block groups are encoded using a second encoding scheme different from the first encoding scheme; and transmitting, according to the feedback configuration, a first feedback report for the first subset of code block groups corresponding to the first encoding scheme and a second feedback report for the second subset of code block groups corresponding to the second encoding scheme based at least in part on determining whether each of the plurality of code block groups of the received transport block are decoded by the UE.

30. A method of wireless communication at a network entity, comprising:

transmitting, to a user equipment (UE) via control signaling, a feedback configuration for reporting feedback for transport blocks encoded with at least two encoding schemes;

transmitting a transport block comprising a plurality of code block groups, wherein a first subset of code block groups of the plurality of code block groups are encoded using a first encoding scheme and a second subset of code block groups of the plurality of code block groups are encoded using a second encoding scheme different from the first encoding scheme; and receiving, from the UE, a first feedback report for the first subset of code block groups corresponding to the first encoding scheme and a second feedback report for the second subset of code block groups corresponding to the second encoding scheme wherein each feedback report indicates whether each of the plurality of code block groups were decoded by the UE.

* * * * *